(12) United States Patent
Faccin et al.

(10) Patent No.: US 11,224,005 B2
(45) Date of Patent: Jan. 11, 2022

(54) DELIVERY OF CONTROL PLANE SERVICES IN MULTI-ACCESS SYSTEMS

(71) Applicant: QUALCOMM Incorporated, San Diego, CA (US)

(72) Inventors: Stefano Faccin, San Ysidro, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 16/031,434

(22) Filed: Jul. 10, 2018

(65) Prior Publication Data

US 2019/0028961 A1 Jan. 24, 2019

Related U.S. Application Data

(60) Provisional application No. 62/534,576, filed on Jul. 19, 2017.

(51) Int. Cl.
*H04W 48/14* (2009.01)
*H04W 76/15* (2018.01)
(Continued)

(52) U.S. Cl.
CPC .......... *H04W 48/14* (2013.01); *H04W 4/70* (2018.02); *H04W 8/02* (2013.01); *H04W 48/02* (2013.01);
(Continued)

(58) Field of Classification Search
CPC ....... H04W 48/14; H04W 4/70; H04W 76/15; H04W 76/10; H04W 8/02; H04W 48/02;
(Continued)

(56) References Cited

U.S. PATENT DOCUMENTS 10,154,523 B2   12/2018   Wu
2009/0286542 A1*  11/2009   Roberts ................ H04W 48/18
                                                              455/436
(Continued)

FOREIGN PATENT DOCUMENTS

EP          3337270 A1      6/2018
WO     WO-2017024841 A1    2/2017

OTHER PUBLICATIONS

Interdigital Communications: "Control Plane Aspects for Interworking between NR and LTE", 3GPP Draft; R2-164091 (NR SI-AI9. 4.3.1 LTE+NR Control Plane Architecture), 3rd Generation Partnership Project (3GPP), Nanjing, China; May 14, 2016, XP051095284, Retrieved from the Internet: URL:http://www.3gpp.org/ftp/tsg_ran/WG2_RL2/TSGR2_94/Docs/ [retrieved on May 14, 2016], 4 pages.

(Continued)

*Primary Examiner* — Christopher M Crutchfield
*Assistant Examiner* — Tito Q Pham
(74) *Attorney, Agent, or Firm* — Holland & Hart LLP

(57) ABSTRACT

Methods, systems, and devices are described for wireless communications. A wireless communication system may use access preferences to indicate a preferred access for communicating signaling for a control plane service. In some aspects, an AMF and a UE may establish access preferences for one or more control plane services and communicate signaling for the control plane service based on the established access preferences. In some cases, the UE may transmit modified access preferences for a control plane service to the AMF, and the UE and AMF may communicate signaling for the control plane service based on the modified access preferences. In some aspects, an AMF may also restrict the accesses used by a control plane service. A UE may also request that certain accesses are restricted for use by a control plane service.

18 Claims, 20 Drawing Sheets

(51) Int. Cl.
*H04W 76/10* (2018.01)
*H04W 48/02* (2009.01)
*H04W 48/18* (2009.01)
*H04W 60/00* (2009.01)
*H04W 60/04* (2009.01)
*H04W 8/22* (2009.01)
*H04W 88/06* (2009.01)
*H04W 8/18* (2009.01)
*H04W 4/70* (2018.01)
*H04W 8/02* (2009.01)

(52) U.S. Cl.
CPC ............ *H04W 48/18* (2013.01); *H04W 60/00* (2013.01); *H04W 76/10* (2018.02); *H04W 76/15* (2018.02); *H04W 8/18* (2013.01); *H04W 8/22* (2013.01); *H04W 60/04* (2013.01); *H04W 88/06* (2013.01)

(58) Field of Classification Search
CPC ....... H04W 48/18; H04W 60/00; H04W 8/18; H04W 8/22; H04W 60/04; H04W 88/06
See application file for complete search history.

(56) References Cited

U.S. PATENT DOCUMENTS

| | | | | |
|---|---|---|---|---|
| 2011/0021195 A1* | 1/2011 | Cormier | ............... | H04W 48/18 455/435.2 |
| 2012/0229296 A1* | 9/2012 | Ree | ............... | G01D 4/002 340/870.02 |
| 2013/0016696 A1* | 1/2013 | Adjakple | .......... | H04W 72/0486 370/331 |
| 2014/0023013 A1* | 1/2014 | Lee | ............... | H04W 28/24 370/329 |
| 2014/0066061 A1* | 3/2014 | Lou | ............... | H04W 48/16 455/434 |
| 2014/0161103 A1* | 6/2014 | Sirotkin | ............... | H04W 48/18 370/332 |
| 2015/0237645 A1* | 8/2015 | Andrianov | ........ | H04W 72/1215 370/329 |
| 2016/0135231 A1* | 5/2016 | Lee | ............... | H04W 48/18 370/329 |
| 2016/0227416 A1* | 8/2016 | Suzuki | ............. | H04W 72/1215 |
| 2018/0242227 A1* | 8/2018 | Zhao | ............... | H04B 7/02 |
| 2019/0013881 A1* | 1/2019 | Olesen | ............... | H04B 1/1027 |
| 2019/0373301 A1* | 12/2019 | Gunasekara | ....... | H04N 21/2393 |
| 2019/0380164 A1* | 12/2019 | Belghoul | ............... | H04W 28/08 |
| 2020/0196112 A1* | 6/2020 | Chandramouli | ........ | H04W 4/14 |
| 2020/0413245 A1* | 12/2020 | Zhu | ............... | H04W 8/26 |
| 2021/0282060 A1* | 9/2021 | Schmidt | ............ | H04W 36/0033 |

OTHER PUBLICATIONS

International Search Report and Written Opinion—PCT/US2018/041608—ISA/EPO—dated Nov. 12, 2018.
Nokia et al., "NR Control Plane Architecture Options for LTE-NR ATight Interworking", 3GPP Draft; R2-163511 NR Control Plane Architecture Options for L TE-NR ATight Interworking, 3rd Generation Partnership Project (3GPP), Nanjing, China; May 22, 2016, XP051104989, Retrieved from the Internet: URL:http://www.3gpp.org/ftp/Meetings_3GPP_SYNC/RAN2/Docs/ [retrieved on May 22, 2016], 5 pages.

* cited by examiner

DELIVERY OF CONTROL PLANE SERVICES IN MULTI-ACCESS SYSTEMS

CROSS REFERENCES

The present Application for patent claims priority to U.S. Provisional Patent Application No. 62/534,576 by FACCIN, et al., entitled "DELIVERY OF CONTROL PLANE SERVICES IN MULTI-ACCESS SYSTEMS," filed Jul. 19, 2017, assigned to the assignee hereof, and which is incorporated herein by reference in its entirety.

BACKGROUND

The following relates generally to wireless communication, and more particularly to delivering control plane services in multi-access systems.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations that each simultaneously support communication for multiple communication devices, otherwise known as user equipment (UEs). In a Long-Term Evolution (LTE) or LTE-Advanced (LTE-A) network, a set of one or more base stations may relate to an eNodeB (eNB). In other examples (e.g., in a next generation or 5G network), a wireless multiple access communication system may include a number of smart radio heads in communication with a number of access node controllers (ANCs), where a set of one or more radio heads, in communication with an ANC, relates to a gNodeB (gNB). A base station or radio head may communicate with a set of UEs on downlink channels (e.g., for transmissions from a base station or radio head to a UE) and uplink channels (e.g., for transmissions from a UE to a base station or radio head).

In some cases, a wireless network includes a core network or various devices, which may authorize one or more UEs to use the wireless network as a connection to a data network and may manage a UE's connection with the wireless network. A UE may access one or more core networks over one or more radio access networks (RAN). A RAN may also be referred to as an access. RANs that use 3rd Generation Partnership Project (3GPP) technologies (e.g., LTE, LTE-U, 5G, etc.) may be characterized as 3GPP accesses, while RAN that use non-3GPP technologies (e.g., Wi-Fi) may be characterized as non-3GPP accesses. In some examples, a UE may access a core network using one or more 3GPP accesses and/or one or more non-3GPP accesses, which may lead to additional complexity and problems based on various accesses between the various components in the network.

SUMMARY

A method of wireless communication is described. The method may include identifying a first access and a second access each associated with a user equipment (UE), identifying data for a control plane service associated with the UE, determining whether the first access or the second access is a preferred access for communicating signaling for the control plane service, and transmitting, to the UE, signaling for the control plane service over the first access or the second access based at least in part on determining whether the first access or the second access is the preferred access.

An apparatus for wireless communication is described. The apparatus may include means for identifying a first access and a second access each associated with a UE, means for identifying data for a control plane service associated with the UE, means for determining whether the first access or the second access is a preferred access for communicating signaling for the control plane service, and means for transmitting, to the UE, signaling for the control plane service over the first access or the second access based at least in part on determining whether the first access or the second access is the preferred access.

Another apparatus for wireless communication is described. The apparatus may include a processor, memory in electronic communication with the processor, and instructions stored in the memory. The instructions may be operable to cause the processor to identify a first access and a second access each associated with a UE, identify data for a control plane service associated with the UE, determine whether the first access or the second access is a preferred access for communicating signaling for the control plane service, and transmit, to the UE, signaling for the control plane service over the first access or the second access based at least in part on determining whether the first access or the second access is the preferred access.

A non-transitory computer readable medium for wireless communication is described. The non-transitory computer-readable medium may include instructions operable to cause a processor to identify a first access and a second access each associated with a UE, identify data for a control plane service associated with the UE, determine whether the first access or the second access is a preferred access for communicating signaling for the control plane service, and transmit, to the UE, signaling for the control plane service over the first access or the second access based at least in part on determining whether the first access or the second access is the preferred access.

Some examples of the method, apparatus, and non-transitory computer-readable medium described above may further include processes, features, means, or instructions for receiving, from the UE, a preference indicator for communicating the signaling for the control plane service over the first access, wherein determining whether the first access or the second access may be the preferred access may be based at least in part on the preference indicator.

Some examples of the method, apparatus, and non-transitory computer-readable medium described above may further include processes, features, means, or instructions for determining that the UE may be in a registered state and a connected state for the first access, wherein determining whether the first access or the second access may be the preferred access may be based at least in part on the UE being in the registered and connected state for the first access.

Some examples of the method, apparatus, and non-transitory computer-readable medium described above may further include processes, features, means, or instructions for determining that the UE may be in an unregistered state and an unconnected state for the first access and a registered state and a connected state for the second access, wherein determining whether the first access or the second access may be the preferred access may be based at least in part on determining that the UE may be in the unregistered state and the unconnected state for the first access and the registered state and the connected state for the second access, and wherein transmitting the signaling for the control plane service comprises transmitting the signaling for the control plane service over the second access based at least in part on determining that the first access may be not the preferred access.

Some examples of the method, apparatus, and non-transitory computer-readable medium described above may further include processes, features, means, or instructions for selecting, for the control plane service, a first preference level of the first access and a second preference level of the second access based at least in part on a preference indicator indicated by the UE, subscription information for the UE, a type of the UE, a capability of the UE, a state of the UE, an origin of the data, network parameters, or any combination thereof, wherein determining whether the first access or the second access may be the preferred access may be based at least in part on selecting the first preference level and the second preference level.

Some examples of the method, apparatus, and non-transitory computer-readable medium described above may further include processes, features, means, or instructions for transmitting, to the UE, an indicator of the first preference level of the first access, or the second preference level of the second access, or both.

In some examples of the method, apparatus, and non-transitory computer-readable medium described above, the determining whether the first access or the second access may be the preferred access comprises determining that the first access may be the preferred access, wherein transmitting the signaling for the control plane service comprises transmitting the signaling over the second access based at least in part on determining that the first access may be the preferred access.

Some examples of the method, apparatus, and non-transitory computer-readable medium described above may further include processes, features, means, or instructions for determining that the first access may be unavailable for the signaling for the control plane service, wherein transmitting the signaling for the control plane service comprises transmitting the signaling over the second access based at least in part on determining that the first access may be unavailable.

Some examples of the method, apparatus, and non-transitory computer-readable medium described above may further include processes, features, means, or instructions for receiving an indicator of a preferred access type for delivering data from the second network entity, wherein the identifying the data comprises identifying the data received from a second network entity.

In some examples of the method, apparatus, and non-transitory computer-readable medium described above, the receiving the indicator comprises receiving the indicator of the preferred access type with the data for the control plane service.

Some examples of the method, apparatus, and non-transitory computer-readable medium described above may further include processes, features, means, or instructions for determining that the first access may be unavailable for the signaling for the control plane service. Some examples of the method, apparatus, and non-transitory computer-readable medium described above may further include processes, features, means, or instructions for transmitting, to the second network entity, an indication that the access may be unavailable, wherein determining whether the first access or the second access may be the preferred access comprises determining that the first access may be of the preferred access type.

Some examples of the method, apparatus, and non-transitory computer-readable medium described above may further include processes, features, means, or instructions for determining that the first access may be unavailable for the signaling for the control plane service, wherein transmitting the signaling for the control plane service comprises transmitting the signaling for the control plane service over the second access based at least in part on determining that the first access may be unavailable, wherein determining whether the first access or the second access may be the preferred access comprises determining that the first access may be of the preferred access type.

Some examples of the method, apparatus, and non-transitory computer-readable medium described above may further include processes, features, means, or instructions for receiving, from the UE, a request restricting communications for the control plane service from being performed on the first access, wherein determining whether the first access or the second access may be the preferred access comprises determining that the second access may be the preferred access based at least in part on the request, and wherein transmitting the signaling for the control plane service comprises transmitting the signaling over the second access based at least in part on determining that the second access may be preferred.

Some examples of the method, apparatus, and non-transitory computer-readable medium described above may further include processes, features, means, or instructions for receiving, from the UE, a request restricting communications for the control plane service from being performed on the first access. Some examples of the method, apparatus, and non-transitory computer-readable medium described above may further include processes, features, means, or instructions for overruling the request based at least in part on a network parameter, wherein determining whether the first access or the second access may be the preferred access comprises determining that the first access may be preferred based at least in part on overruling the request. Some examples of the method, apparatus, and non-transitory computer-readable medium described above may further include processes, features, means, or instructions for transmitting, to the UE, an indication that the request may have been overruled, wherein transmitting the signaling for the control plane service comprises transmitting the signaling over the first access based at least in part on overruling the request, wherein transmitting the signaling for the control plane service comprises transmitting the signaling over the first access based at least in part on overruling the request.

In some examples of the method, apparatus, and non-transitory computer-readable medium described above, the control plane service may be a non-protocol data unit (PDU) service.

Some examples of the method, apparatus, and non-transitory computer-readable medium described above may further include processes, features, means, or instructions for determining that communications for the control plane service may be barred on the first access. Some examples of the method, apparatus, and non-transitory computer-readable medium described above may further include processes, features, means, or instructions for transmitting, to the UE, an indication that communications for the control plane service may be barred on the first access, wherein determining whether the first access or the second access may be the preferred access may be based at least in part on determining that communications for the control plane service may be barred on the first access.

Some examples of the method, apparatus, and non-transitory computer-readable medium described above may further include processes, features, means, or instructions for receiving, from the UE, second signaling for the control plane service over the first access after transmitting the indication that communications for the control plane service may be barred on the first access. Some examples of the method, apparatus, and non-transitory computer-readable medium described above may further include processes, features, means, or instructions for transmitting, to the UE, reconfiguration information based at least in part on receiving the second signaling. Some examples of the method, apparatus, and non-transitory computer-readable medium described above may further include processes, features, means, or instructions for receiving, from the UE, at least one regenerated preference level for communication signaling for the control plane service.

Some examples of the method, apparatus, and non-transitory computer-readable medium described above may further include processes, features, means, or instructions for receiving, from the UE, a request to renegotiate a preference level for communicating signaling for the control plane service. Some examples of the method, apparatus, and non-transitory computer-readable medium described above may further include processes, features, means, or instructions for modifying the preference level for the control plane service based at least in part on the request.

A method of wireless communication is described. The method may include identifying a first access and a second access each associated with a network entity and receiving, from the network entity, signaling for a control plane service over the first access or the second access based at least in part on whether the first access or the second access is a preferred access for communicating signaling for the control plane service.

An apparatus for wireless communication is described. The apparatus may include means for identifying a first access and a second access each associated with a network entity and means for receiving, from the network entity, signaling for a control plane service over the first access or the second access based at least in part on whether the first access or the second access is a preferred access for communicating signaling for the control plane service.

Another apparatus for wireless communication is described. The apparatus may include a processor, memory in electronic communication with the processor, and instructions stored in the memory. The instructions may be operable to cause the processor to identify a first access and a second access each associated with a network entity and receive, from the network entity, signaling for a control plane service over the first access or the second access based at least in part on whether the first access or the second access is a preferred access for communicating signaling for the control plane service.

A non-transitory computer readable medium for wireless communication is described. The non-transitory computer-readable medium may include instructions operable to cause a processor to identify a first access and a second access each associated with a network entity and receive, from the network entity, signaling for a control plane service over the first access or the second access based at least in part on whether the first access or the second access is a preferred access for communicating signaling for the control plane service.

Some examples of the method, apparatus, and non-transitory computer-readable medium described above may further include processes, features, means, or instructions for transmitting, to the network entity during a registration management procedure, a preference indicator for communicating the signaling for the control plane service over the first access or the second access.

Some examples of the method, apparatus, and non-transitory computer-readable medium described above may further include processes, features, means, or instructions for generating, for each control plane service of a plurality of control plane services that comprises the control plane service, at least one preference level for communicating control plane signaling based at least in part on a preconfigured parameter, a network-provided parameter, network traffic, or any combination thereof.

In some examples of the method, apparatus, and non-transitory computer-readable medium described above, the generating the at least one preference level comprises generating a first preference level for the first access and the control plane service and a second preference level for the first access and the control plane service, receiving signaling for the control plane service comprises receiving signaling over the first access based at least in part on the first preference level being higher than the second preference level.

Some examples of the method, apparatus, and non-transitory computer-readable medium described above may further include processes, features, means, or instructions for regenerating the at least one preference level, wherein receiving signaling for the control plane service comprises receiving signaling over the first access based at least in part on the first preference level being higher than the second preference level.

Some examples of the method, apparatus, and non-transitory computer-readable medium described above may further include processes, features, means, or instructions for identifying data for the control plane service. Some examples of the method, apparatus, and non-transitory computer-readable medium described above may further include processes, features, means, or instructions for determining whether the first access or the second access may be the preferred access. Some examples of the method, apparatus, and non-transitory computer-readable medium described above may further include processes, features, means, or instructions for transmitting, to the network entity, second signaling for the control plane service over the first access based at least in part on determining whether the first access or the second may be the preferred access.

Some examples of the method, apparatus, and non-transitory computer-readable medium described above may further include processes, features, means, or instructions for determining that the first access may be unavailable, wherein determining whether the first access or the second access may be the preferred access may be based at least in part determining that the first access may be unavailable. Some examples of the method, apparatus, and non-transitory computer-readable medium described above may further include processes, features, means, or instructions for transmitting, to the network entity, second signaling associated with the control plane service over the second access based at least in part on the determining.

Some examples of the method, apparatus, and non-transitory computer-readable medium described above may further include processes, features, means, or instructions for transmitting, to the network entity, a request restricting communications for the control plane service from being performed on the first access, wherein receiving signaling for the control plane service comprises receiving the signaling over the second access based at least in part on the request.

Some examples of the method, apparatus, and non-transitory computer-readable medium described above may further include processes, features, means, or instructions for receiving, from the network entity, an indication that the request may have been overruled, wherein receiving signaling for the control plane service comprises receiving the signaling over the first access.

Some examples of the method, apparatus, and non-transitory computer-readable medium described above may further include processes, features, means, or instructions for receiving, from the network entity, an indication that communications for the control plane service may be restricted from being performed on the first access, wherein receiving the signaling comprises receiving the signaling over the second access after receiving the indication.

Some examples of the method, apparatus, and non-transitory computer-readable medium described above may further include processes, features, means, or instructions for transmitting, from the UE, second signaling associated with the control plane service over the first access after receiving the indication. Some examples of the method, apparatus, and non-transitory computer-readable medium described above may further include processes, features, means, or instructions for receiving, from the network entity, reconfiguration information. Some examples of the method, apparatus, and non-transitory computer-readable medium described above may further include processes, features, means, or instructions for regenerating a first preference level for the first access and a second preference level for the second access based at least in part on the reconfiguration information, the regenerated first preference level being lower than the regenerated second preference level.

Some examples of the method, apparatus, and non-transitory computer-readable medium described above may further include processes, features, means, or instructions for transmitting, to the network entity, a request to renegotiate a preference level for communicating signaling for the control plane service. Some examples of the method, apparatus, and non-transitory computer-readable medium described above may further include processes, features, means, or instructions for identifying a renegotiated preference level for the control plane service based at least in part on the renegotiation.

DETAILED DESCRIPTION

Figure 1:
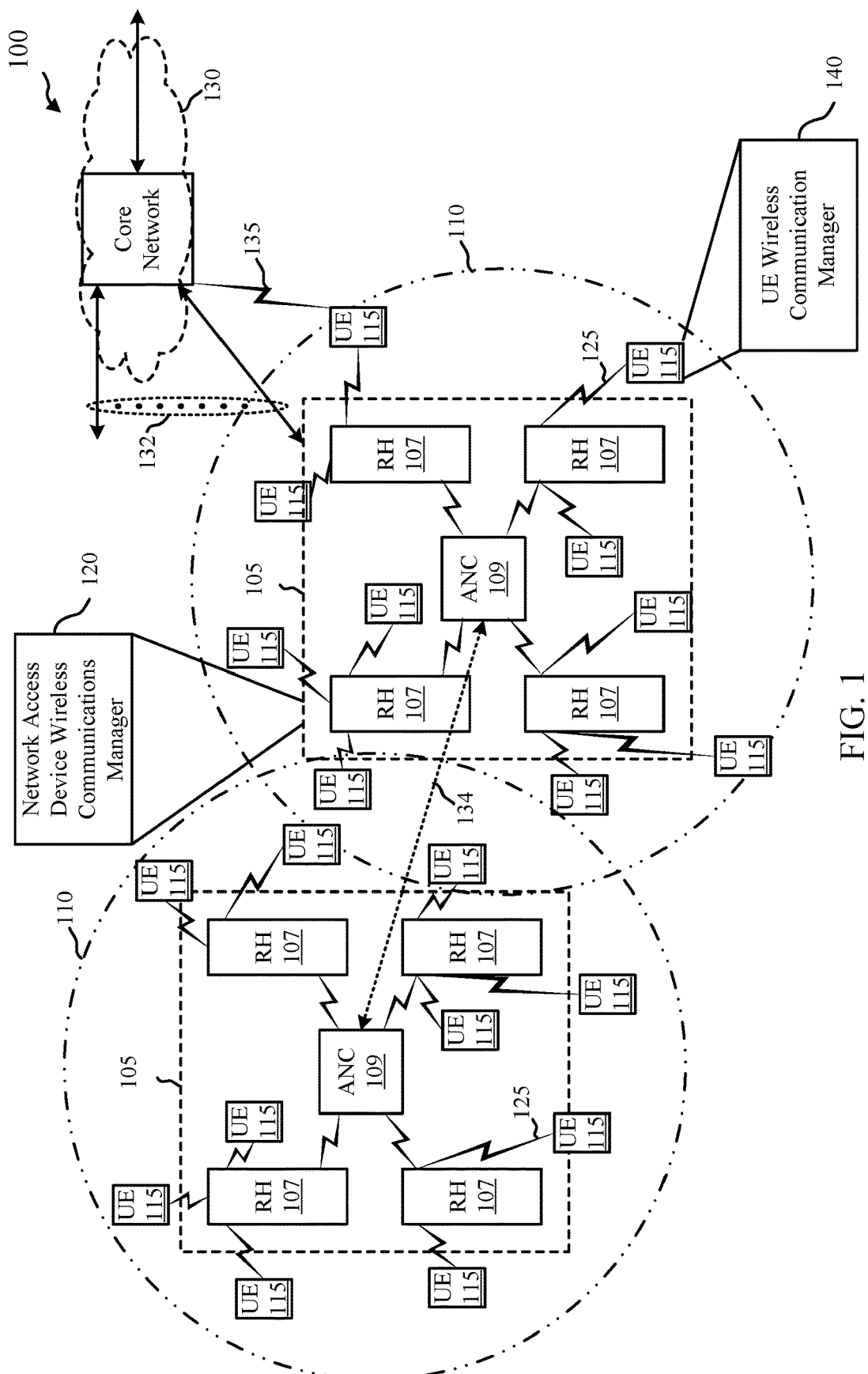
FIGS. 1 through 4 show examples of wireless communications systems in accordance with one or more aspects of the present disclosure.

A wireless network may employ techniques for delivering control plane services to a core network. One or more radio access networks (RANs), or accesses, may be used to connect a device with one or more core networks. For instance, one or more 3rd Generation Partnership Project (3GPP) RANs and/or one or more non-3GPP RANs may be used to connect a device and a core network. In some examples, each access used to connect a device and a core network may be associated with an N1 signaling interface. Multiple control plane services (e.g., registration services, location services, mobility services) may be used to establish and maintain connections between devices and the network. A control plane service (which may also be referred to as "a non-protocol data unit (PDU) session service") may be defined as a service for which data exchange does not require the establishment of a user plane connection, such as a PDU session. By contrast, a user plane service (e.g., text, voice, e-mail, etc.) may exchange user data only after a PDU session has been established. Oftentimes, certain operations for a control plane service are performed at a device, while other operations for the control plane service are performed at different devices, such as those included in the core network. To support the operation of a control plane service across a device and a core network, information for the multiple control plane services may be communicated between the device and the network. In some aspects, information for a control plane service may be communicated between a device and a network over the one or more accesses (e.g., via the one or more N1 signaling interfaces). In some examples, a device and a network may consider preferences for communicating signaling over certain accesses, or N1 signaling interfaces, when delivering the information for the control plane services.

For example, an access and mobility management function (AMF) related to a core network may establish preferences for communicating signaling for a control plane service or group of control plane services over certain accesses or access types (e.g., access preferences) with a user equipment (UE). An access type may include multiple attributes including a radio access technology (RAT) associated with an access (e.g., 3GPP or non-3GPP), a registration and connected management state of the UE for an access (e.g., deregistered, registered, connected, idle), and the like. In some aspects, the AMF may establish the access preferences based on preconfigured network parameters, network conditions (e.g., channel traffic), characteristics of a type of control plane service, and the like. In some examples, the AMF may generate a preference for transmitting control information for a particular control plane service to the UE over one or more accesses or access types. For instance, the AMF may generate a preference for transmitting signaling for a location service to a UE over a 3GPP access. Information transmitted by the AMF or received by the UE may be referred to as mobile-terminated (MT) data. The AMF may also generate a preference for receiving signaling for a registration service over a 3GPP access.

Information received by the AMF or transmitted by the UE may be referred to as mobile-originated (MO) data.

In some examples, the AMF may transmit the access preferences to a UE, while in other examples the UE may be preconfigured with access preferences that are the same as (or different from) those stored at the AMF. After receiving the access preferences, the UE may communicate signaling for the control plane service according to the access preferences. For instance, the UE may transmit MO information for a location service over a 3GPP access and may expect to receive MT information for a registration service over a 3GPP access.

In some examples, the UE may also generate its own access preferences (e.g., UE access preferences) and transmit the UE access preferences to the AMF. For instance, the UE may indicate, to an AMF, that a 3GPP access is preferred for transmitting information for a location service. In another instance, the UE may indicate, to the AMF, that an access that is in a connected state is preferred for receiving information for a registration service from the core network. In some examples, the AMF receives the access preferences from the UE and communicates signaling for one or more control plane services based on the received access preferences. For instance, the AMF may modify an earlier preference for receiving signaling for a registration service over a 3GPP access so that a preferred access for receiving registration service signaling is over an access in a connected state. In some instances, the AMF disregards, or overrules, all or a portion of the UE access preferences received from the UE and communicates signaling for the one or more control plane services based on access preferences that are already established at the AMF.

In some examples, an AMF establishes restrictions for communicating signaling for a control plane service or group of control plane services over certain accesses or access types with a UE. In some aspects, the AMF may establish restrictions based on network parameters or channel conditions (e.g., network congestion). For instance, an AMF may prohibit, or bar, communicating signaling for a mobility service over a non-3GPP access. In some aspects, a restriction established by the AMF may overrule a UE access preference of the UE. The AMF may send an indication of the restrictions to the UE. In some aspects, the restrictions are included with the access preferences previously transmitted to the UE. Similarly, a UE may establish restrictions for communicating signaling for a control plane service or group of control plane services over certain accesses or access types with a UE. The UE may request that the AMF prohibit signaling for certain control plane services over certain accesses And the AMF may choose whether to honor all or a portion of the UE restrictions in the restriction request. In some aspects, the AMF may indicate to the UE when a restriction request has been denied. In some aspects, the restriction request may be included with the UE access preferences previously transmitted to the AMF.

In some examples, an AMF may receive signaling for a control plane service from another network entity within the core network (e.g., a session management function (SMF) or a user plane function (UPF)). In some aspects, the signaling for the control plane service may include (e.g., in a header) an indication of a preference for communicating the signaling over a certain access. For instance, the signaling for the control plane service may indicate a preference for communicating the signaling over a non-3GPP access. In some aspects, the AMF may transmit the signaling for the control plane service over a non-3GPP access based on the received indication. In some aspects, the AMF may disregard the signaling and transmit the signaling for the control plane service over a 3GPP access—e.g., when a non-3GPP access is not available or in an idle state, when UE access preferences request that signaling for the control plane service use a 3GPP access, when a restriction or restriction request prohibits signaling for the control plane service over a non-3GPP access, and the like.

In some examples, an AMF may disregard access preferences or restrictions when no other accesses are available for signaling information for a control plane service. In some examples, a UE may disregard access preferences or restrictions when no other accesses are available for signaling information for a control plane service. In some examples, the AMF and UE may renegotiate access preferences at a later time. In some aspects, the AMF and UE may renegotiate access preferences based on changing channel conditions or network parameters. In some aspects, the AMF may trigger the UE to update access preferences at the UE based on receiving control plane service signaling from the UE over a restricted access. In some examples, a UE may renegotiate access preferences with an AMF during a registration procedure. In some examples, an AMF may renegotiate access preferences with a UE during a UE configuration update procedure.

Features of the disclosure introduced above are further described below in the context of a wireless communications system. Specific examples are then described of an example process flow for delivery of control plane services in a multi-access network. These and other features of the disclosure are further illustrated by and described with reference to apparatus diagrams, system diagrams, and flowcharts that relate to delivery of control plane services in a multi-access network.

FIG. 1 shows an example of a wireless communications system 100 in accordance with one or more aspects of the disclosure. The wireless communications system 100 may include network access devices 105, which may include base stations, eNBs, gNBs, and/or radio heads (RHs), UEs 115, and a core network 130. In some examples, the wireless communications system 100 may be an LTE (or LTE-A) network, or a New Radio (NR) network. In some aspects, wireless communications system 100 may support enhanced broadband communications, ultra-reliable (i.e., mission critical) communications, low latency communications, and communications with low-cost and low-complexity devices.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some aspects, a UE 115 may be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a network access device 105. In some aspects, groups of UEs 115 communicating via D2D communications may utilize a one-to-many (1:M) system in which each UE 115 transmits to every other UE 115 in the group. In some aspects, a network access device 105 facilitates the scheduling of resources for D2D communications. In other aspects, D2D communications are carried out independent of a network access device 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some aspects, an MTC device may operate using half-duplex (one-way) communications at a reduced peak rate. MTC devices may also be configured to enter a power saving "deep sleep" mode when not engaging in active communications. In some aspects, MTC or IoT devices may be designed to support mission critical functions and wireless communications system may be configured to provide ultra-reliable communications for these functions.

A network access device 105 may include an access node controller (ANC) and one or more radio heads 107. In some aspects, a network access device 105 may wirelessly communicate with the UEs 115 via one or more radio heads 107, with each radio head 107 having one or more antennas. Each of the radio heads 107 may provide communication coverage for a respective geographic coverage area 110, and may provide one or more remote transceivers associated with an ANC 109. A radio head 107 may perform many of the functions of an LTE/LTE-A base station. In some examples, an ANC 109 may be implemented in distributed form, with a portion of the ANC 109 being provided in each radio head 107. The geographic coverage area 110 for a radio head 107 may be divided into sectors making up only a portion of the coverage area (not shown). In some examples, the network access devices 105 may be replaced with alternative network access devices, such as base transceiver stations, radio base stations, access points, radio transceivers, NodeBs, eNBs, Home NodeBs, Home eNBs, etc. The wireless communications system 100 may include radio heads 107 (or base stations or other network access devices) of different types (e.g., macro cell and/or small cell network access devices). The geographic coverage areas 110 of the radio heads 107 or other network access devices may overlap. In some examples, different network access devices 105 may be associated with different radio access technologies.

A network access device 105 may communicate with the core network 130 and with one another. For example, a network access device 105 may interface with the core network 130 through backhaul links 132 (e.g., S1, etc.). The network access devices 105 may communicate with one another over backhaul links 134 (e.g., X2, etc.) either directly or indirectly (e.g., through core network 130). The network access device 105 may also perform radio configuration and scheduling for communication with UEs 115, or may operate under the control of a base station controller (not shown). In some examples, a network access device 105 may be macro cells, small cells, hot spots, or the like. A network access device 105 may also be referred to as a base station, gNB, or an eNB.

A network access device 105 may be connected by an S1 interface to the core network 130. The core network 130 may be an evolved packet core (EPC), which may include at least one mobility management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network access devices 105 (e.g., base stations, eNBs, gNBs, ANCs) may interface with the core network 130 through backhaul links 132 (e.g., S1, S2, etc.) and may perform radio configuration and scheduling for communication with the UEs 115. In various examples, the ANCs 109 may communicate, either directly or indirectly (e.g., through core network 130), with each other over backhaul links 134 (e.g., X1, X2, etc.), which may be wired or wireless communication links. Each ANC 109 may also communicate with a number of UEs 115 through a number of the smart radio heads 107. In an alternative configuration of the wireless communications system 100, the functionality of an ANC 109 may be provided by a radio head 107 or distributed across the radio heads 107 of a network access device 105. In another alternative configuration of the wireless communications system 100, the radio heads 107 may be replaced with base stations, and the ANCs 109 may be replaced by base station controllers (or links to the core network 130).

The core network 130 may include several entities (e.g., functions) such as AMFs, SMFs, UPFs and others, that may be virtually implemented in software. In some examples, the UEs 115 may communicate with an entity of the core network 130 over a first radio access network (e.g., a 3GPP access) and/or a second radio access network (e.g., a non-3GPP access). In some examples, the wireless communications system 100 may include a 5G network, which may support simultaneous 3GPP access (e.g., LTE) and non-3GPP access (e.g., Wi-Fi). In other examples, the wireless communications system 100 may include an LTE/LTE-A network. The wireless communications system 100 may in some aspects be a heterogeneous network, in which different types of eNBs provide coverage for various geographical regions. For example, each network access device 105 or radio head 107 may provide communication coverage for a macro cell, a small cell, and/or other types of cell.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of devices and network equipment including macro eNBs or gNBs, small cell eNBs or gNBs, relay base stations, and the like.

The communication links 125 shown in wireless communications system 100 may include uplink (UL) channels from a UE 115 to a radio head 107, and/or downlink (DL) channels, from a radio head 107 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using time division multiplexing (TDM) techniques (e.g., as described with reference to FIG. 2), frequency division multiplexing (FDM) techniques (e.g., as described with reference to FIG. 3), or hybrid TDM-FDM techniques (e.g., as described with reference to FIG. 4, 5, or 6). In some examples, the control information transmitted during a transmission time interval (TTI) of a downlink channel may be distributed between different control regions in a cascaded manner (e.g., between a common control region and one or more UE-specific control regions).

Each communication link 125 may include one or more carriers. A carrier may also be referred to as a component carrier (CC), a layer, a channel, etc. The terms "carrier," "component carrier," "cell," and "channel" may be used interchangeably herein. The term "cell" is a 3GPP term that can be used to describe a base station, a radio head, a carrier or component carrier associated with a base station or a radio head, or a coverage area (e.g., sector, etc.) of a carrier or base station, depending on context. Each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and time division duplexing (TDD) (e.g., frame structure type 2) may be defined. In some examples, a UE 115 may communicate with the core network 130 through communication link 135.

In some aspects, wireless communications system 100 may operate in an ultra-high frequency (UHF) frequency region using frequency bands from 700 MHz to 2600 MHz (2.6 GHz), although in some aspects wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some aspects, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some aspects, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and network access devices 105. Devices operating in mmW or EHF bands may have multiple antennas to allow beamforming. That is, a network access device 105 (e.g., a gNB) may use multiple antennas or antenna arrays to conduct beamforming operations for directional communications with a UE 115. Beamforming (which may also be referred to as spatial filtering or directional transmission) is a signal processing technique that may be used at a transmitter (e.g., a network access device 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Wireless communications system 100 may also use multiple-input multiple-output (MIMO) communications. In wireless systems that use MIMO for transmissions between a transmitter (e.g., a base station) and a receiver (e.g., a UE), both the transmitter and the receiver may be equipped with multiple antennas. Some portions of wireless communications system 100 may use beamforming. For example, network access device 105 (e.g., an eNB) may have an antenna array with a number of rows and columns of antenna ports that the network access device 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some examples of the wireless communications system 100, the radio heads 107 and/or UEs 115 may include multiple antennas for employing antenna diversity schemes to improve communication quality and reliability between radio heads 107 and UEs 115. Additionally or alternatively, radio heads 107 and/or UEs 115 may employ MIMO techniques that may take advantage of multi-path environments to transmit multiple spatial layers carrying the same or different coded data. In some aspects, the antennas of a network access device 105 or UE 115 may be located within one or more antenna arrays, which may support beamforming or MIMO operation. One or more base station antennas or antenna arrays may be collocated at an antenna assembly, such as an antenna tower. In some aspects, antennas or antenna arrays associated with a network access device 105 may be located in diverse geographic locations. A network access device 105 may use multiple antennas or antenna arrays to conduct beamforming operations for directional communications with a UE 115.

In some aspects, wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology or NR technology in an unlicensed band such as the 5 Ghz Industrial, Scientific, and Medical (ISM) band. When operating in unlicensed radio frequency spectrum bands, wireless devices such as network access devices 105 (e.g., base stations) and UEs 115 may employ listen-before-talk (LBT) procedures to ensure the channel is clear before transmitting data. In some aspects, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In some aspects, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some aspects perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency.

In the control plane, the Radio Resource Control (RRC) protocol layer may provide establishment, configuration, and maintenance of an RRC connection between a UE 115 and a radio head 107, ANC 109, or core network 130 supporting radio bearers for user plane data. The control plane may be used to communicate signaling to support the operation of control plane services. The UE 115 may use control plane services (e.g., registration services, mobility management services, etc.) to receive authorization to connect to and to maintain a connection with core network 130. At the Physical (PHY) layer, transport channels may be mapped to physical channels. In some aspects, a PDU session may be established for communicating data services (e.g., SMS, voice, email, voice over IP (VOIP), etc.) over a network. For instance, the establishment of a PDU session may correspond to the establishment of an evolved packet system (EPS) bearer between a UE 115 and a data network (DN). In some examples, control plane service signaling may be communicated to a core network 130 without establishing a packet data network (PDN) session.

One or more of the network access devices 105 (e.g., one or more network access devices 105, eNB, gNB) may include a network access device wireless communication manager 120. In some examples, the network access device wireless communication manager 120 may be an example of the network entity wireless communications manager 815, 915 or 1015 described with reference to FIG. 8, 9, or 10, and may be used to establish preferences for communicating signaling for one or more control plane services or control plane service groups (e.g., access preferences) and transmit and receive signaling over certain accesses for the one or more control plane services based on the access preferences. In some aspects, the network access device wireless communication manager 120 may update the access preferences based on UE access preferences received from a UE 115. The network access device wireless communication manager 120 may also communicate signaling for a control plane service over an access based on an indicated preference in control plane service information received from another network entity.

One or more of the UEs 115 may include a UE wireless communication manager 140. In some examples, the UE wireless communication manager 140 may be an example of the UE wireless communications manager 1115, 1215 or 1315 described with reference to FIG. 11, 12, or 13, and may be used to establish preferences for communicating signaling for one or more control plane services or control plane service groups (e.g., UE access preferences) and transmit and receive signaling for the one or more control plane services based on the access preferences. In some aspects, the UE wireless communication manager 140 may transmit UE access preferences to a network access device 105. In some aspects, the UE wireless communication manager 140 may receive access preferences from a network access device 105 and transmit and receive control plane service signaling over one or more accesses based on the received access preferences. The UE wireless communication manager 140 may also be used to register the UE 115 over one or more accesses with one or more core networks 130.

Figure 2:
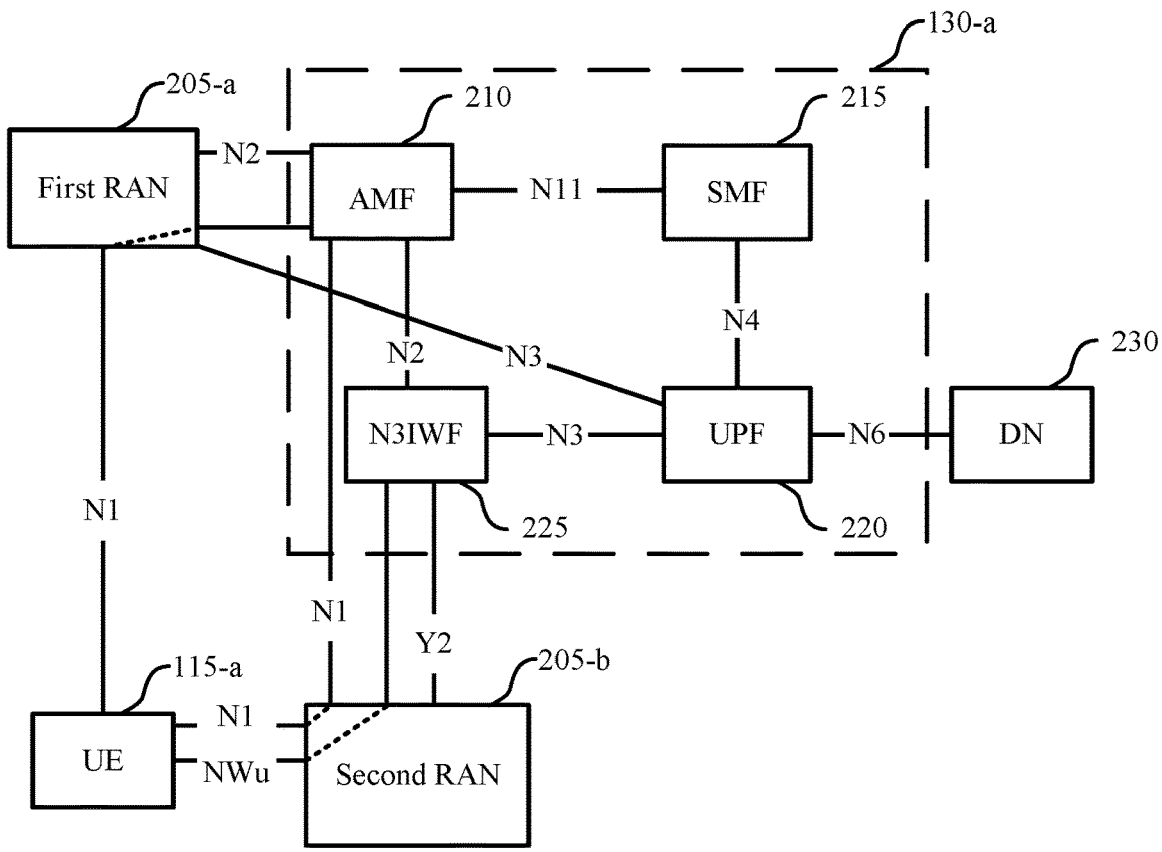
Figure 2:
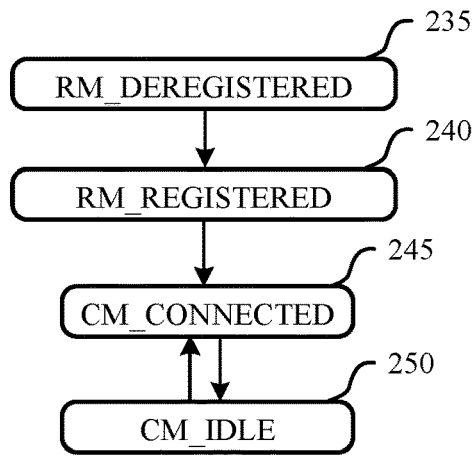

FIG. 2 shows an example of a wireless communications system 200 in accordance with one or more aspects of the present disclosure. Wireless communications system 200 may include UE 115-a and core network 130-a, which may be examples of a UE 115 and a core network 130, and may communicate with one another as described above with reference to FIG. 1. Core network 130-a may include AMF 210, SMF 215, UPF 220, and non-3GPP interworking function (N3IWF) 225, among other components. Wireless communications system 200 may also include first RAN 205-a, second RAN 205-b and DN 230.

In some aspects, UE 115-a may communicate with core network 130-a via first RAN 205-a using a first RAT and/or second RAN 205-b using a second RAT. First RAN 205-a may be a 3GPP RAN in which communications are transmitted over a 3GPP access, while second RAN 205-b may be a non-3GPP RAN in which communications are transmitted over a non-3GPP access. In other examples, both first RAN 205-a and second RAN 205-b may be 3GPP RANs in which communications are transmitted over a 3GPP access. First RAN 205-a may also be referred to as a first access, and second RAN 205-b may also be referred to as a second access.

As discussed above, core network 130-a may be used to provide UE 115-a with access to a wireless communication network and to transport data from DN 230 to UE 115-a. For instance, core network 130-a may restrict or authorize UE 115-a to access the network and may support mobility services for UE 115-a as UE 115-a moves about the network coverage area. Core network 130-a may include one or more AMFs, SMFs, UPFs, and a N3IWF, which may each perform functions to support establishing a wireless connection between UE 115-*a* and core network 130-*a*.

AMF 210 may provide access and mobility management services for UE 115-*a*. In some examples, AMF 210 may serve as the primary point of control plane signaling communications with UE 115, such that all control plane communications between UE 115-*a* and the core network 130-*a* may pass through AMF 210 (either directly for communications over 3GPP access, or both directly and indirectly via the N3IWF 225 for non-3GPP access). In some examples, an N1 signaling interface is used solely for control plane signaling (i.e., is used to signal information for control plane services but not to transport user plane data). For example, for uplink communications, UE 115-*a* may identify a payload for a control plane service to transmit to a specific network entity (or function) of the core network 130-*a*, and may transmit the payload to AMF 210. Similarly, for downlink communication, a network entity (or function) may transmit a payload for a control plane service to AMF 210, and AMF 210 may relay the payload to UE 115-*a* over control plane signaling over N1. AMF 210 may communicate with SMF 215 over communication link N11, and may communicate with UE 115-*a* over communication link N1. Communications between AMF 210 and UE 115-*a* may be over 3GPP access or non-3GPP access. In some examples, AMF 210 may page UE 115-*a*. For instance, UE 115-*a* may page UE 115-*a* if UE 115-*a* is in a connection management (CM) idle (CM_IDLE) state. In some aspects, AMF 210 may transmit the paging message to UE 115-*a* over the 3GPP access, while in other aspects, AMF 210 may transmit the paging message to UE 115-*a* over the non-3GPP access.

SMF 215 may provide session management services for the UE 115-*a*. Specifically, SMF 215 may establish, modify, and release sessions (or bearers) for communication between UE 115-*a* and DN 230. For example, SMF 215 may maintain a tunnel for communication between UPF 220 and an access network (AN) node. In addition, SMF 215 may allocate and manage IP addresses or Ethernet addresses for UE 115-*a*, select and control user plane functions, configure traffic steering at UPF 220 to route traffic to proper destinations, terminate SM parts of non-access stratum (NAS) messages, and provide roaming functionality. SMF 215 may communicate with UPF 220 over communications link N4 and may communicate with AMF 210 over communications link N11. For example, SMF 215 may receive a notification from UPF 220 over communications link N4 when there is no user plane tunnel N3 established for an existing session. The notification may indicate that there is data (e.g., one or more PDUs) ready for transmission to UE 115-*a* for a PDU session. In some aspects, a PDU session must be established before UE 115-*a* may exchange user data with core network 130-*a*.

In some examples, SMF 215 may relay this information to AMF 210 over communications link N11. In other examples, SMF 215 may determine whether to transmit a paging request to AMF 210 over communications link N11 based at least in part on information stored at SMF 215. For example, SMF 215 may store data related to a paging state of SMF 215. The paging state may be a no paging state or a paging state. The paging state of SMF 215 may be indicated by a timer such that SMF 215 is in the no paging state while the timer is active and the paging state when the timer is inactive. SMF 215 may also store data related to a CM state of the UE 115-*a*. The CM state of UE 115-*a* may be an idle state (e.g., CM_IDLE), an active state (e.g., CM_CONNECTED), or an unknown state.

UPF 220 may include functionality for serving as the point of interconnect to DN 230 for an external PDU session. In some aspects, UPF 220 may be the anchor point for intra-RAT and inter-RAT mobility. UPF 220 may route and forward packets to and from DN 230, inspect packets and enforce policy rules in the user plane, report traffic usage, handle quality of service (QoS) for user plane packets, and verify uplink traffic.

N3IWF 225 may include functionality for serving as an intermediary between UE 115-*a* and AMF 210 for communications over the non-3GPP access, especially for registration and session establishment. For example, during registration N3IWF 225 may select an appropriate AMF and relay authentication and registration messages received from UE 115-*a* to AMF 210, and vice versa. N3IWF 225 may also route uplink and downlink transmissions between UE 115-*a* and DN 230 via UPF 220 over communications link N3.

DN 230 may be used to transfer data between network access point. In some aspects, DN 230 may be an example of a local DN, a central DN, or a public land mobile network (PLMN). In some wireless systems (e.g., a 5G wireless system), UE 115-*a* may access DN 230 to exchange data packets, or one or more PDUs, using a PDU session. A PDU session may be an association between UE 115-*a* and DN 230 that provides a PDU connectivity service. The association between UE 115-*a* and DN 230 in a PDU session may use IP or Ethernet, or the association may be unstructured.

UE 115-*a* may perform a registration procedure to register with core network 130-*a* to receive authorization to access mobile services (e.g., an initial registration), enable mobility tracking, and/or enable reachability. UE 115-*a* may perform a registration procedure for initial access to core network 130-*a*, when changing to a new tracking area (TA) while in an idle mode, and/or when performing a periodic update.

In some examples, UE 115-*a* may register over one or more accesses to core network 130-*a*. For instance, UE 115-*a* may register to core network 130-*a* via first RAN 205-*a*. First RAN 205-*a* may be a 3GPP access network (e.g., LTE, 5G, etc.), and may be referred to as a 3GPP access. UE 115-*a* may also register to the same or a different core network 130-*a* via second RAN 205-*b*. Second RAN 205-*b* may be a non-3GPP access or an untrusted non-3GPP access (e.g., Wi-Fi), and may be referred to as a non-3GPP access. When the UE registers over first RAN 205-*a* and second RAN 205-*b* to the same core network (e.g., core network 130-*a*), AMF 210 may be used to manage and keep track of both the 3GPP access and the non-3GPP access. When the UE registers over first RAN 205—*a* and second RAN 205-*b* to different core networks (e.g. different PLMNs), multiple AMFs may be used, where one AMF may manage and keep track of the 3GPP access and the other AMF may manage and keep track of the non-3GPP access. In some aspects, UE 115-*a* may access core network 130-*a* via first RAN 205-*a* while concurrently accessing core network 130-*a* via second RAN 205-*b*. In other aspects, UE 115-*a* may access core network 130-*a* solely via first RAN 205-*a* or second RAN 205-*b*.

UE 115-*a* may also be associated with a resource management (RM) state. For instance, UE 115-*a* may either be in RM_DEREGISTERED state 235 or RM_REGISTERED state 240. The RM state of UE 115-*a* may depend on a type of registration procedure being performed by UE 115-*a*. For instance, if UE 115-*a* is performing a registration procedure for an initial access to core network 130-*a*, UE 115-*a* may be in RM_DEREGISTERED state 235. And if UE 115-*a* is performing a registration procedure after entering a new TA, then UE 115-*a* may be in RM_REGISTERED state 240.

UE 115-*a* may also be associated with a CM state. For instance, UE 115-*a* may either be in CM_CONNECTED state 245 or a CM_IDLE state 250. When UE 115-*a* has no NAS signaling connection established with AMF 210 over the N1 link, UE 115-*a* may be in the CM_IDLE state 250. When UE 115-*a* has an NAS signaling connection established with AMF 210 over the N1 link, UE 115-*a* may be in the CM_CONNECTED state 245. While in CM_IDLE state, UE 115-*a* may respond to paging from AMF 210 or perform a service request when UE 115-*a* has uplink signaling or user data to send to core network 130-*a*. UE 115-*a* may transition to CM_CONNECTED state 245 when a signaling connection is established with core network 130-*a* (e.g., when UE 115-*a* enters an RRC Connected state over a 3GPP access (e.g., via first RAN 205-*a*) or establishes a PDU Session). UE 115-*a* may also enter CM_CONNECTED state 245 when an initial NAS message, such as a registration request, service request, or deregistration request, is sent. UE 115-*a* may transition to the CM_IDLE state 250 when an established signaling connection with core network 130-*a* is released. AMF 210 may similarly transition between CM_CONNECTED state 245 and CM_IDLE state 250. In some aspects, AMF 210 may release an NAS signaling connection with UE 115-*a*, and both UE 115-*a* and AMF 210 may transition to CM_IDLE state 250. In some cases, AMF 210 stores an RM and CM state for UE 115-*a* for each access.

In some examples, UE 115-*a* registers with core network 130-*a* without establishing a PDU session. When UE 115-*a* is registered with core network 130-*a* without an established PDU session and in CM_CONNECTED state 245, UE 115-*a* may maintain a signaling link with AMF 210 and maintain the ability to exchange NAS signaling via an N1 signaling interface. Thus, control plane services that use the control plane as transport (e.g., non-PDU services) are available to UE 115-*a*. For instance, UE 115-*a* may have an N1 signaling interface established between AMF 210 and first RAN 205-*a*. UE 115-*a* may also have a N1 signaling interface established between AMF210 and second RAN 205-*b* via N3IWF 225. When first RAN 205-*a* is a 3GPP access and UE 115-*a* has an NAS signaling connection established with AMF 210 over first RAN 205-*a*, UE 115-*a* may be in a 3GPP RM_REGISTERED state 240 and CM_CONNECTED state 245.

As discussed above, UE 115-*a* may register with core network 130-*a* via first RAN 205-*a* and/or second RAN 205-*b*. In some examples, certain accesses may have different conditions for communicating with core network 130-*a* than other accesses. For instance, core network 130-*a* may be able to page UE 115-*a* over first RAN 205-*a*, but not over second RAN 205-*b* (e.g., for accesses that establish connectivity via an IP secure tunnel). In some aspects, each access may be associated with its own RM state and CM state and communications over the one or more accesses may be based on a state combination of the one or more accesses.

In some aspects, UE 115-*a* may communicate signaling for one or more control plane services over the one or more accesses based on the state combination of each of the one or more accesses. For instance, if UE 115-*a* is in CM_CONNECTED state 245 over first RAN 205-*a* and is in CM_IDLE state 250 over second RAN 205-*b* and cannot be paged over second RAN 205-*b*, UE 115-*a* may communicate both MO signaling—i.e., signaling generated at the UE and sent to a base station—and MT signaling—i.e., signaling generated at the base station and sent to the UE—for a control plane service over first RAN 205-*a* at least until UE 115-*a* transitions to CM_CONNECTED state 245 over second RAN 205-*b*. In another instance, if UE 115-*a* is in CM_IDLE state 250 over first RAN 205-*a* and can be paged over first RAN 205-*a*, and is in CM_CONNECTED state 245 over second RAN 205-*b*, UE 115-*a* may perform both MO and MT transmissions for a control plane service over either first RAN or second RAN 205-*a* and 205-*b*. In another instance, if UE 115-*a* is in CM_IDLE state 250 over first RAN 205-*a* and cannot be paged over first RAN 205-*a* (e.g., is outside of the coverage area), and is in CM_CONNECTED state 245 over second RAN 205-*b*, UE 115-*a* may perform both MO and MT transmissions for a control plane service over second RAN 205-*b*. And in another instance, if UE 115-*a* is in CM_IDLE state 250 over first RAN 205-*a* and cannot be paged over first RAN 205-*a*, and is in CM_IDLE state 250 over second RAN 205-*b* and cannot be paged, UE 115-*a* may perform MO transmissions for a control plane service over second RAN 205-*b* after UE 115-*a* transitions to CM_CONNECTED state 245 over second RAN 205-*b*.

In some aspects, core network 130-*a* and/or UE 115-*a* may have a preference for delivering MO or MT signaling for a control plane service over a certain access (e.g., delivery preferences). In some aspects, the delivery preferences of core network 130-*a* and/or UE 115-*a* may be dependent on a registration and connection management state of UE 115-*a* over first RAN 205-*a* and second RAN 205-*b*. (e.g., based on the instances set forth above). In some aspects, core network 130-*a* and/or UE 115-*a* may also have policies restricting the delivery of MO and/or MT signaling on certain access for certain control plane services. For instance, core network 130-*a* may prohibit signaling of control plane services that use 3GPP location services over an access using a non-3GPP access (e.g., second RAN 205-*b*).

Figure 3:
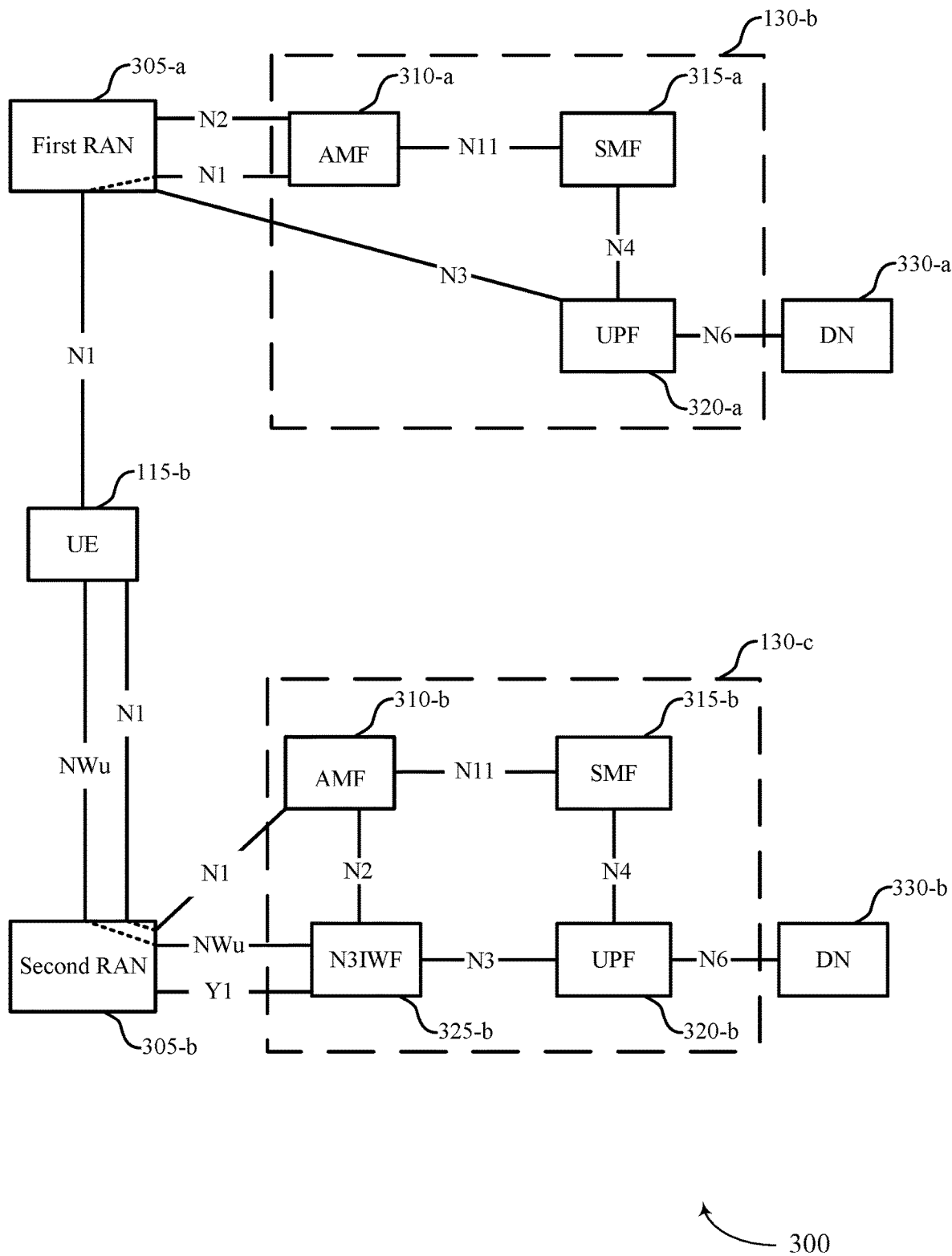

FIG. 3 shows an example of a wireless communications system 300 in accordance with one or more aspects of the present disclosure. Wireless communications system 300 may include UE 115-*b*, first core network 130-*b*, and second core network 130-*c*, which may be examples of a UE 115 and a core network 130, and may communicate with one another as described above with reference to FIG. 1. In some cases, first core network 130-*b* includes first AMF 310-*a*, first SMF 315-*a*, and first UPF 320-*a*, while second core network 130-*c* includes second AMF 310-*b*, second SMF 315-*b*, second UPF 320-*b*, and N3IWF 325-*b*. Wireless communications system 300 may also include first RAN 305-*a*, second RAN 305-*b*, AMFs 310, SMFs 315, UPFs 320, N3IWFs 325, first DN 330-*a* and second DN 330-*b*, among other components.

First RAN 305-*a*, second RAN 305-*b*, first AMF 310-*a*, second AMF 310-*b*, first SMF 315-*a*, second SMF 315-*b*, first UPF 320-*a*, second UPF 320-*b*, N3IWF 325, and first DN 330-*a* and second DN 330-*b* may be examples of a first RAN 205-*a*, a second RAN 205-*b*, an AMF 210, a UPF 320, a N3IWF 325, and a DN 230 of FIG. 2.

In some examples, UE 115-*b* may register to first core network 130-*b* over first RAN 305-*a* and may register to second core network 130-*c* over second RAN 305-*b*. In some examples, UE 115-*b* may use first AMF 310-*a* to manage the delivery of control plane services over first RAN 305-*a* and second AMF 310-*b* to manage the delivery of control plane services over second RAN 305-*b*. In some aspects, first AMF 310-*a* stores an RM and CM state for UE 115-*b* over first RAN 305-*a*, while second AMF 310-*b* stores an RM and CM state for UE 115-*b* over second RAN 305-*b*. In some examples, UE 115-*b* communicates first access preferences for communicating signaling for one or more control plane services over first AMF 310-*a* and second access preferences for communicating signaling for one or more control plane services over second AMF 310-*b*. In some aspects, UE 115-*b* may communicate with first AMF 310-*a* based on a registration and connection management state of UE 115-*b* for first RAN 305-*a*, and may communicate with second AMF 310-*b* based on a registration and connection management state of UE 115-*b* for first RAN 305-*b*. In some examples, second AMF 310-*b* may restrict certain control plane services from using an N1 signaling interface for second RAN 305-*b*.

Figure 4:
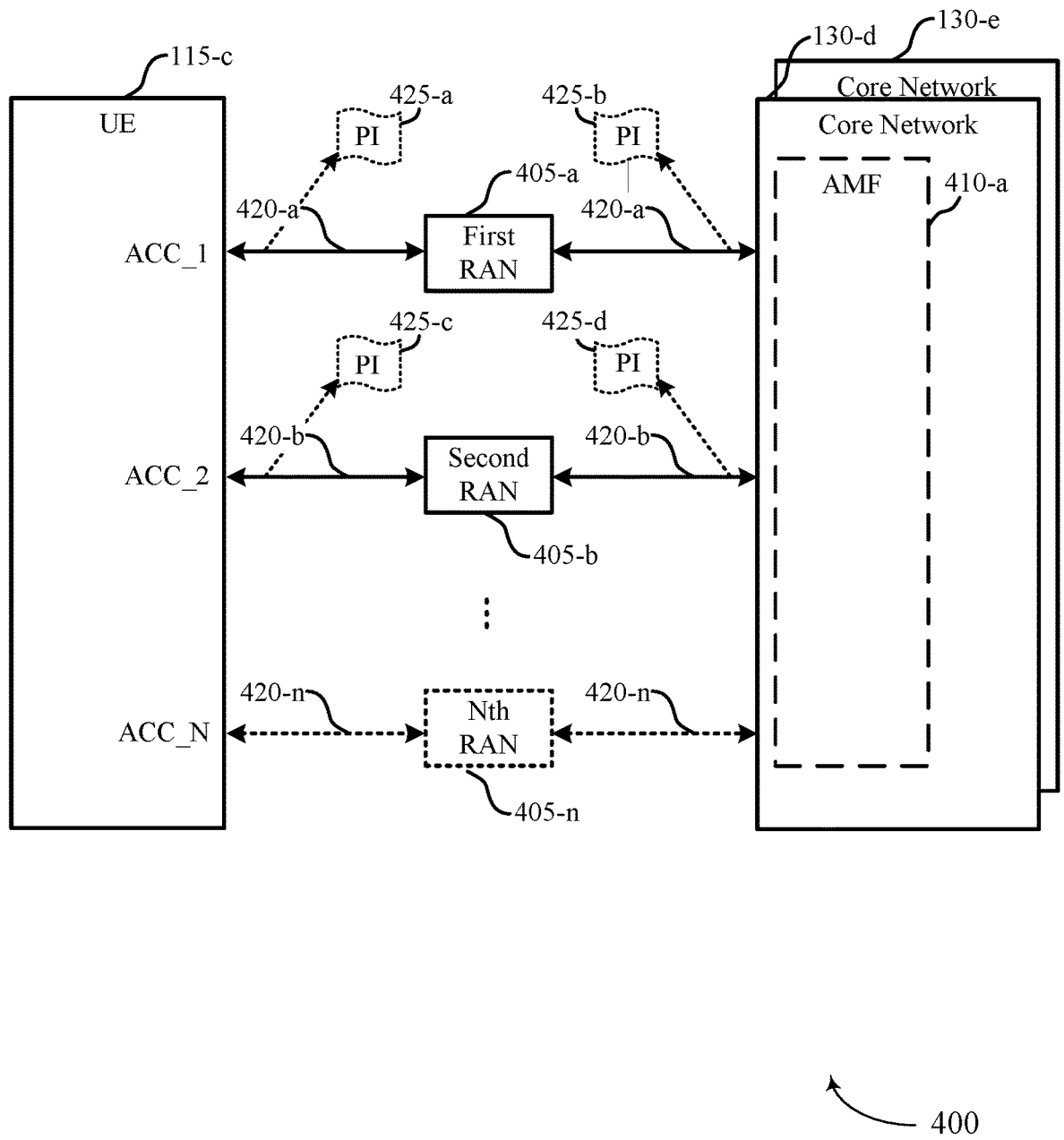

FIG. 4 shows an example of a wireless communications system 400 in accordance with one or more aspects of the present disclosure. Wireless communications system 400 may include UE 115-*c*, first core network 130-*d*, and second core network 130-*e*, which may be examples of a UE 115 and a core network 130, and may communicate with one another as described above with reference to FIGS. 1-3. Wireless communications system 200 may also include first RAN 405-*a*, second RAN 405-*b*, and up to an nth RAN 405-*n*. Wireless communications system 400 may also include one or more AMFs 410, first N1 signaling interface 420-*a*, second N1 signaling interface 420-*b*, and up to an nth N1 signaling interface 420-*n*.

First RAN 405-*a* and second RAN 405-*b* may be examples of, and perform similar functions as, the first RAN 205-*a* and the second RAN 205-*b* discussed in FIG. 2. An AMF 410 may be an example of, and perform similar functions as, the AMF 210 discussed in FIG. 2. An N1 signaling interface 420 may be used to communicate control plane service information between UE 115-*c* and a core network 130 without establishing a PDU session. In some cases, an N1 signaling interface 420 is established for each RAN 405 used by UE 115-*c*.

First core network 130-*d* and second core network 130-*e* may each include an AMF 410. UE 115-*c* may access first core network 130-*d* and second core network 130-*e* via one or more RANs 405. In some examples, UE 115-*c* may use N1 signaling interface 420-*a* to communicate control plane service information with first core network 130-*d* via first RAN 405-*a*, and/or a second N1 signaling interface 420-*b* to communicate control plane service information with second core network 130-*d* via second RAN 405-*b*. In some examples, first RAN 405-*a* is a 3GPP access, while second RAN 405-*b* is a non-3GPP access. In other examples, both first RAN 405-*a* and second RAN 405-*b* are 3GPP accesses. In some examples, UE 115-*c* may use N1 signaling interface 420-*a* to communicate control plane service information with first core network 130-*d* via first RAN 405-*a*, and a second N1 signaling interface 420-*b* to communicate control plane service information with second core network 130-*e* via second RAN 405-*b*.

In some aspects, UE 115-*c* may also indicate preferences for communicating signaling for a control plane service (or "access preferences") over one RAN 420, or N1 signaling interface 420, instead of another RAN 420 or N1 signaling interface 420 based on an origin of the data (e.g., MO or MT), network parameters, a type of accesses used UE 115-*c*, a registration and connected management state of the UE for an access, the type of UE 115-*a*, and the like. In some examples, UE 115-*c* indicates, in first preference indicator 425-*a*, a different set of access preferences for each control plane service or for groups of control plane services. By sending first preference indicator 425-*a* to core networks 130-*d* and/or 130-*e*, UE 115-*c* may request that signaling for one or more control plane services be communicated over certain N1 signaling interfaces 420, when those N1 signaling interfaces 420 meet certain criteria.

In some aspects, first preference indicator 425-*a* may also include a request restricting communications for a control plane service on one or more N1 signaling interfaces 420. For instance, UE 115-*c* may request that signaling for a location service be prohibiting from being sent on second N1 signaling interface 420-*b*.

First core networks 130-*d* and second core network 130-*e* may have their own preferences for communicating signaling for control plane services on certain N1 signaling interfaces 420. In some examples, first core network 130-*d* and second core network 130-*e* may take into account the preferences of UE 115-*c* included in first preference indicator 425-*a*. For instance, first core network 130-*d* may communicate (e.g., transmit/receive) signaling for one or more control plane services over N1 signaling interfaces 420 that have been indicated as preferred by UE 115-*c*. In other examples, first core network 130-*d* and second core network 130-*e* may disregard the preferences of UE 115-*c*. For instance, first core network 130-*d* may set or follow rules prohibiting signaling for certain control plane signaling from being sent on certain N1 signaling interfaces 420. In some aspects, first core network 130-*d* and second core network 130-*e* may transmit their own preferences and restrictions for communicating signaling for one or more control plane services to UE 115-*c* in second preference indicator 425-*b*. In some aspects, second preference indicator 425-*b* is provided in list form or as a bitmap. In some examples, UE 115-*c* may modify its own access preferences based on the information received in second preference indicator 425-*b*.

In some examples, UE 115-*c* uses both first N1 signaling interface 420-*a* to communicate with core network 130-*d* via first RAN 405-*a*, where first RAN 405-*a* is a 3GPP access, such as an LTE network. And UE 115-*c* uses second N1 signaling interface 420-*b* to communicate with core network 130-*d* via second RAN 405-*b*, where second RAN 405-*b* is a non-3GPP access, such as a Wi-Fi network. In some aspects, UE 115-*c* may not have a PDU session established with a DN through core network 130-*d* when communicating over first N1 signaling interface 420-*a* and second N1 signaling interface 420-*b*. UE 115-*a* may indicate a preference for communicating signaling for a control plane service over a certain N1 signaling interface 420 in first preference indicator 425-*a*, and may transmit/receive signaling for the control plane service over either first N1 signaling interface 420-*a* or second N1 signaling interface 420-*b* based on the indicated preference.

For instance, UE 115-*c* may signal a preference for communicating signaling for a control plane service with core network 130-*d* over a 3GPP N1 signaling interface 420 when UE 115-*c* is registered and connected with core network 130-*d* over first RAN 405-*a*, instead of a non-3GPP N1 signaling interface 420 when UE 115-*c* is registered and connected with core network 130-*d* over second RAN 405-*b*, in first preference indicator 425-*a*. UE 115-*c* may then communicate signaling for the control plane service over first N1 signaling interface 420-*a* instead of N1 signaling interface 420-*b* based on the indicated preference. For example, if first RAN 405-*a* is a 3GPP access and UE 115-*a* is in a RM_REGISTERED state and a CM_CONNECTED state with core network 130-*d* over first RAN 405-*a* and second RAN 405-*b* is a non-3GPP access and UE 115-*a* is in a RM_REGISTERED state and a CM_IDLE state with core network 130-*d* over second RAN 405-*b*, UE 115-*c* may transmit/receive signaling for the control plane service over first N1 signaling interface 420-*a* based on the indicated preference.

In another instance, UE 115-*c* may signal a preference for communicating signaling for a control plane service with core network 130-*d* over a non-3GPP N1 signaling interface 420 and communicate the signaling for the control plane service over either first N1 signaling interface 420-*a* or second N1 signaling interface 420-*b* based on the indicated preference.

In another instance, UE 115-*c* may signal a preference for communicating MT signaling for a control plane service over a RAN 405 that supports paging when both first N1 signaling UE 115-*a* is in an idle state over multiple RANs. In some examples, 3GPP access networks may support paging while non-3GPP access networks may not support paging. For example, if first RAN 405-*a* is a 3GPP access and UE 115-*a* is in a RM_REGISTERED state and a CM_IDLE state over first RAN 405-*a*, and second RAN 405-*b* is a non-3GPP access in a RM_REGISTERED state and a CM_IDLE state over second RAN 405-*b*, UE 115-*c* may receive signaling for the control plane service over first N1 signaling interface 420-*a*.

In some instances, UE 115-*a* is registered with core network 130-*d* over only one RAN 405, and UE 115-*c* communicates signaling for a control plane service over the N1 signaling interface 420 associated with the registered access regardless of access preferences indicated by UE 115-*c* for communicating signaling for that control plane service. Similarly, core network 130-*d* may communicate over the N1 signaling interface 420 associated with the registered access regardless of access preferences indicated by UE 115-*c* or access preferences stored at core network 130-*d*

First core network 130-*d* may similarly signal one or more preferences to UE 115-*c* for communicating signaling for one or more control plane services. In some examples, first core network 130-*d* takes into account the access preferences indicated by UE 115-*c* in first preference indicator 425-*a*. For instance, first core network 130-*d* may receive a preference from UE 115-*c* for communicating signaling for a control plane service over a 3GPP N1 signaling interface 420. For example, if first RAN 405-*a* is a 3GPP access and second RAN 405-*b* is a non-3GPP access, first core network 130-*d* may transmit signaling for the control plane service over first N1 signaling interface 420-*a*, even when UE 115-*a* is in an CM_IDLE state over first RAN 405-*a* and in a CM_CONNECTED state over second RAN 405-*b*.

In another instance, first core network 130-*d* may receive a preference from UE 115-*c* indicating a preference for communicating signaling for a control plane service over an N1 signaling interface 420 in a connected state. For example, if UE 115-*a* is in a RM_REGISTERED and CM_CONNECTED state over first RAN 405-*a* and is in a RM_REGISTERED and CM_IDLE state over second RAN 405-*b*, first core network 130-*d* may communicate signaling to UE 115-*c* for the control plane service over first N1 signaling interface 420-*a*. In some aspects, first core network 130-*d* indicates to UE 115-*c* that UE 115-*c* may communicate signaling for the control plane service over the preferred access in second preference indicator 425-*b*.

In some aspects, first core network 130-*d* may override a preference indicated by UE 115-*c* in first preference indicator 425-*a*. For instance, UE 115-*c* may indicate a preference for communicating signaling for a control plane service over an N1 signaling interface 420 in a connected state. However, first core network 130-*d* may have a preference for communicating control signaling for the control plane service over a 3GPP access. For example, if first RAN 405-*a* is a 3GPP access and second RAN 405-*b* is a non-3GPP access, and UE 115-*a* is in an RM_REGISTERED and CM_IDLE state over first RAN 405-*a* and is in an RM_REGISTERED and CM_CONNECTED state over second RAN 405-*b*, first core network 130-*d* may communicate signaling to UE 115-*c* for the control plane service over first N1 signaling interface 420-*a*. In some aspects, first core network 130-*d* indicates to UE 115-*c* that the preference of UE 115-*c* has been overridden in second preference indicator 425-*b*.

In some examples, UE 115-*c* may not indicate any preferences to first core network 130-*d*. For instance, first core network 130-*d* may indicate preferences for which accesses are used for signaling for one or more control plane service to UE 115-*c*, and UE 115-*c* may preform signaling for the one or more control plane services accordingly. In some aspects, first core network 130-*d* indicates access preferences in second preference indicator 425-*b*. Second preference indicator 425-*b* may be signaled using high layer signaling (e.g., RRC signaling, initial configuration signaling, registration signaling, etc.). In another instance, UE 115-*c* may be preconfigured with preferences for which accesses are used for signaling for one or more control plane service UE 115-*c* may indicate a restriction in first preference indicator 425-*a* to first core network 130-*d* requesting that signaling for certain control plane services not be communicated over a certain RANs 405. For instance, UE 115-*c* may indicate that signaling for a certain control plane service not be communicated over first RAN 405-*a*. In some aspects, first core network 130-*d* will not communicate signaling for the control plane service over first N1 signaling interface 420-*a* based on the received restriction request. But in some aspects, first core network 130-*d* may communicate signaling for the control plane service over first N1 signaling interface 420-*a* despite allowing the restriction request if no other RANs 405 are available. In other aspects, first core network 130-*d* may override the restriction request, transmit signaling to UE 115-*c* that the restriction request has been overridden, and communicate signaling for the control plane service over first N1 signaling interface 420-*a* based on overriding the received restriction request.

In some examples, first core network 130-*d* indicates a restriction in second preference indicator 425-*b* to UE 115-*c* indicating that signaling for certain control plane services is not to be communicated over a certain N1 signaling interface 420. For instance, first core network 130-*d* may indicate to UE 115-*c* that certain MO control plane services are prohibited from using certain RANs 405. First core network 130-*d* may also indicate to UE 115-*c* that certain MT control plane services will avoid usage of certain RANs 405. For example, first core network 130-*d* may prohibit UE 115-*c* from using second RAN 405-*b* for signaling for a mobility service and may indicate the restriction to UE 115-*c*.

Control plane signaling sent from other entities within first core network 130-*d* to AMF 410-*a* may indicate access preferences in the control plane signaling (e.g., in a header). For instance, AMF 410-*a* may receive control plane signaling for a mobility management service from an SMF. The control plane signaling may include an indication of a preference for communicating the signaling over a 3GPP access (e.g., over first RAN 405-*a*). In some examples, first core network 130-*d* may communicate the signaling over first N1 signaling interface 420-*a* based on the indicated preference. In other examples, first core network 130-*d* may communicate the signaling over second N1 signaling interface 420-*b* despite the indicated preferences—e.g., based on determining that a 3GPP access is not available (e.g., UE 115-*a* is in an RM_DEREGISTERED state over first RAN 405-*a*).

In some examples, UE 115-*c* and first core network 130-*d* may renegotiate access preferences for delivering signaling for a control plane service. For instance, UE 115-*c* may send a new set of access preferences to first core network 130-*d* in first preference indicator 425-*a*. In some examples, UE 115-*c* and first core network 130-*d* renegotiate the access preferences during an RM procedure, such as a registration service request, a network-triggered service request, a generic UE configuration update procedure, and the like.

By establishing preferences for communicating signaling for one or more control plane services over RANs 420, both UE 115-*c* and first core network 130-*d* may know where to transmit signaling and where to expect signaling for a control plane service, which may decrease overhead by reducing additional signaling indicating where the signaling will be transmitted. Establishing the preference may also increase throughput by establishing preferences that enable UE 115-*c* and first core network 130-*d* to use an access associated with the lowest latency for transmitting the control plane service. For example, UE 115-*c* and first core network 130-*d* may establish a preference for communicating signaling over a connected non-3GPP access instead of paging a UE over 3GPP access and communicating the signaling over the 3GPP access.

In some aspects, UE 115-*c* may indicate to both first core network 130-*d* and second core network 130-*e* preference levels for communicating signaling for a control plane service over a RAN 405 based on an origin of the data (e.g., MO or MT), network parameters, a type of access(es) used by UE 115-*c*, a registration and connected management state of the UE for an access, the type of UE 115-*c*, and the like. In some examples, UE 115-*c* indicates, in first preference indicator 325-*a* and second preference indicator 325-*b*, a different set of preference levels for each control plane service or for groups of control plane services. In some aspects, UE 115-*c* may indicate to first core network 130-*d* access preferences for a first set of control plane services using first preference indicator 425-*a*, and to second core network 130-*e*, a second set of control plane services using third preference indicator 425-*c*.

In some aspects, first core network 130-*d* may decide which of the control plane services indicated in first preference indicator 425-*a* will be granted access over first RAN 405-*a* and second core network 130-*e* may decide which of the control plane services indicated in third preference indicator 425-*c* will be granted access over first RAN 405-*c*. In some cases, first core network 130-*d* may provide conditions to UE 115-*c*; for instance, first core network 130-*d* may allow signaling for an otherwise restricted control plane service over first RAN 405-*c* when second RAN 405-*c* is not available. Alternatively, first core network 130-*d* or second core network 130-*e* may allow signaling for all control plane services over a corresponding RAN 405 (e.g., first RAN 405-*a* or second RAN 405-*b*) when only one RAN 405 is available. First core network 130-*d* may also indicate whether signaling for additional control plane services not included in first preference indicator 425-*a* should also be communicated over first RAN 405-*c*.

For the sake of example, the above description generally discusses first RAN 405-*a* as a 3GPP access and second RAN 405-*b* as a non-3GPP access. However, in some examples, both first RAN 405-*a* and second RAN 405-*b* are 3GPP access, in which case, UE 115-*c* and first core network 130-*d* may similarly establish access preferences for using one 3GPP access over another 3GPP access (e.g., based on the RAT of the access, a registration and connection management state of the UE for the access, a control plane service, an origin of the data, and the like). Likewise, both first RAN 405-*a* and second RAN 405-*b* may be non-3GPP accesses.

Figure 5:
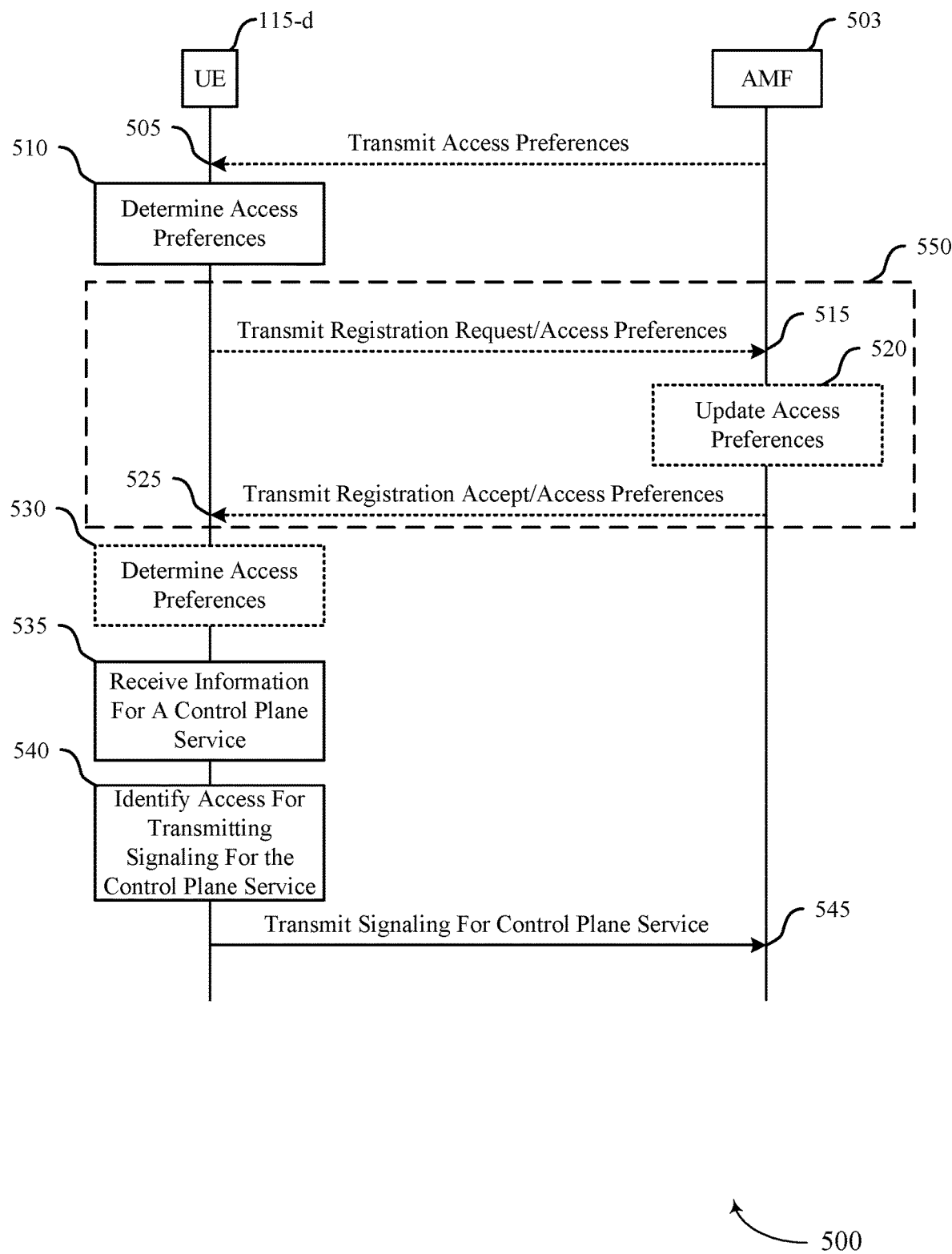
FIGS. 5 through 7 show diagrams illustrating examples of control plane service delivery in accordance with one or more aspects of the present disclosure.

FIG. 5 shows a diagram 500 illustrating an example of control plane service delivery in accordance with one or more aspects of the present disclosure. Features of diagram 500 may be performed by UE 115-*d* and AMF 503, which may be an example of a UE 115 and an AMF 210, 310 or 410 as described above with reference to FIGS. 2-4. In some examples, a UE and an AMF, such as UE 115-*d* and AMF 503, may exchange control signaling based on preferences for signaling control information for a control plane service over certain accesses.

At 505, AMF 503 may optionally transmit preferences for communicating signaling for one or more control plane services or control plane service groups to UE 115-*d* over certain accesses (e.g., access preferences). In some examples, AMF 503 sends the access preferences via access stratum signaling (e.g., in RRC signaling) or in broadcast over the access link (e.g. a master information block (MIB), a system information block (SIB), and the like). AMF 503 may convey access preferences to UE 115-*d* in any of a number of formats including a bitmap, a list, and the like. In some aspects, UE 115-*d* may be preconfigured with access preferences and AMF 503 may not send access preferences to UE 115-*d*.

In some aspects, AMF 503 identifies access preferences for one or more control plane service signaling based on the type of control plane service, a RAT of an access, a UE type, an origin of data, a registration and connection management state of the UE for an access, and the like. For instance, AMF 503 may determine a first access preference for a first control plane service (e.g., a preference for communicating information for a mobility service over a 3GPP access) and a second access preference for a second control plane service (e.g., a preference for communicating information for a reregistration service over a non-3GPP access). Moreover, AMF 503 may prefer to use one access for MO signaling for a control plane service and prefer to use a second access for MT signaling for the control plane service. Furthermore, AMF 503 may prefer to receive or transmit over access based on characteristics or states of the access. For instance, AMF 503 may prefer to communicate control plane service signaling over accesses that are in a connected state or that are reachable by paging. In another aspect, AMF 503 may prefer to communicate controls service signaling over 3GPP accesses (e.g., LTE).

In some examples, AMF 503 generates a list of preference levels for certain accesses or access types. For instance, AMF 503 may determine that a 3GPP access that is in a registered and connected state is most preferred for MO signaling and that a non-3GPP access that is deregistered and idle is least preferred for MO signaling. AMF 503 may also determine that a non-3GPP access that is in a registered and connected state is most preferred for MT signaling.

In some examples, AMF 503 may also generate restrictions for communicating signaling for one or more control plane services or control plane service groups over a certain access or access type. AMF 503 may transmit the restrictions to UE 115-*d* along with the access preferences.

At 510, UE 115-*d* may determine access preferences for communicating control plane services to AMF 503. In some aspects, UE 115-*d* determines the access preferences based on the access preferences received from AMF 503. For instance, UE 115-d may receive a list of preferences for one or more control plane services or control plane service groups from AMF 503 and may determine access preferences accordingly. In some aspects, UE 115-d may identify a preferred access or a preferred access type for accessing AMF 503. In some aspects, UE 115-d may identify a preferred access or preferred access type for communicating signaling for a control plane service (or non-PDU service) or a group of control plane services. In some examples, UE 115-d may identify preferences for each control plane service or each control plane service group used by UE 115-d.

In some aspects, UE 115-d may determine the access preferences independent of receiving access preferences from AMF 503 (e.g., AMF may not transmit or broadcast any access preferences). For example, UE 115-d may be preprogrammed with a set of access preferences for communicating control information (e.g., a set of access preferences that matches a set of access preferences at AMF 503). In some aspects, UE 115-d may similarly generate access preferences and/or preference levels as AMF 503. UE 115-d may also generate a restriction request that restricts communicating signaling for one or more control plane services or control plane service groups over a certain access or access type.

At 515, UE 115-d may optionally transmit access preferences for communicating control plane services to AMF 503. In some aspects, UE 115-d may transmit access preferences to AMF 503 that were previously determined at UE 115-d for a control plane service. In some aspects, UE 115-d may generate access preferences based on the access preferences received from AMF 503, and may refrain from transmitting its own access preferences to AMF 503. In some aspects, UE 115-d may modify the access preferences received from AMF 503 and may transmit an indication of which access preferences have been modified to AMF 503. UE 115-d may include the restriction request with the access preferences. In some aspects, UE 115-d may transmit the access preferences in NAS signaling during a control plane procedure 550. For instance, UE 115-d may transmit the access preferences in a registration request message during a registration procedure or in an attach request message during an initial attach procedure. In some examples, UE 115-d transmits the NAS signaling over a RAN, which may be a 3GPP RAN or a non-3GPP RAN. In some aspects, the registration request message may include a registration type, a temporary user ID, a subscriber permanent identifier (SUPI), a 5G-globally unique temporary identifier (5G-GUTI), security parameters, network slice selection assistance information (NSSAI), a 5G core network capability, PDU session status, PDU sessions to be reactivated, Mobile Interactive Voice Response and Control (MICO) mode parameters, and control plane (or non-PDU) service information.

At 520, AMF 503 may optionally update access preferences for communicating control plane services based on the access preferences received from UE 115-d. For instance, AMF 503 may upgrade or downgrade a preference level for communicating signaling for a control plane service over a certain access or access type. AMF 503 may also update access preferences based on a restriction request received from UE 115-d. In some aspects, AMF 503 may overrule the access preferences and/or restrictions received from UE 115-d, and may not make any changes to preference levels set at AMF 503. In some cases, AMF 503 may also establish a context for UE 115-d, in addition to access and mobility policy data for UE 115-e. In some aspects, the access and mobility policy data is established based on access preferences transmitted by UE 115-d during the registration request.

At 525, AMF 503 may optionally transmit updated access preferences to UE 115-d. In some aspects, the updated access preferences may be transmitted in a list or bitmap format. In some examples, AMF 503 may indicate the solely access preferences that were modified to save overhead. In aspects where AMF 503 overrules the access preferences transmitted by UE 115-d, AMF 503 may transmit an indication to UE 115-d that the access preferences have been overruled. In some aspects, registration for UE 115-e to AMF 603 may be completed at 525. In some aspects, AMF 503 sends a registration accept message to UE 115-e indicating that the registration has been accepted. The registration accept message may include a 5G-GUTI, a registration area, mobility restrictions, PDU session status, an NSSAI, a periodic registration update timer, local area data network (LADN) information, an accepted MICO mode, and control plane (or non-PDU) service information. the accepted access preferences for communicating control plane signaling. Control plane service information may include access preferences for communicating control plane signaling for one or more control plane services or control plane service groups. The control plane service information may be determined based on subscription information, network policies, network traffic, or access preferences provided by UE 115-d, or any combination thereof. In some aspects, control plane service information is provided by AMF 503 if, based on policies and subscription information, UE 115-d is allowed to transmit or receive non-PDU services over different accesses or when the UE or when the UE is capable of connecting to multiple accesses.

At 530, UE 115-d may optionally determine access preferences based on the updated access preferences. In some aspects, UE 115-d may update access preferences or preference levels stored at UE 115-d based on the updated access preferences received from AMF 503. In some aspects, UE 115-d may also update access preferences or preference levels stored at UE 115-d based on an indication that a restriction request was granted from AMF 503. For instance, UE 115-d may prohibit signaling for a control plane service on a certain access based on determining that a restriction request was granted. In other aspects, UE 115-d may determine that the access preferences are unchanged—e.g., based on receiving an overrule indicator from AMF 503.

At 535, UE 115-d may receive information for a control plane service. For instance, data for a mobility service may be generated by an application within UE 115-d.

At 540, UE 115-d may identify an access for transmitting the information for the control plane service to AMF 503. In some aspects, UE 115-d identifies an access for transmitting the information based on the negotiated or predetermined access preferences or preference levels previously established at UE 115-d. For instance, UE 115-d may have a preference for transmitting location service information over a 3GPP access. In some examples, a 3GPP access and a non-3GPP access are available to UE 115-d and may both be used to connect with AMF 503. In some aspects, UE 115-d may transmit the location service information over an N1 signaling interface of the 3GPP access. In some instances, UE 115-d may also identify a preference for transmitting over a non-3GPP access when UE 115-d is in a connected state over the non-3GPP access and when a 3GPP access is not available. For example, UE 115-d may determine that a 3GPP access is not available and that a non-3GPP access is in a connected state, UE 115-d may then transmit location service information over the non-3GPP access based on this second preference. In other instances, UE 115-*d* may identify a preference for refraining from communicating signaling for a control plane service when a 3GPP access is not available regardless of a registration and connection management state of UE 115-*d* for a non-3GPP access. For example, for mobility services which may need access to an AMF 503 or aspects of AMF 503 that are not available to non-3GPP accesses. In some aspects UE 115-*d* may determine that the 3GPP access is not available and that the non-3GPP access is in a connected state and refrain from transmitting based on the second preference.

At 545, UE 115-*d* may transmit signaling for a control plane service to AMF 503 over an access based on the access preferences at UE 115-*d* and the identified accesses established by UE 115-*d*. In some aspects, AMF 503 may expect to receive the signaling for the control plane service over the selected access. For instance, AMF 503 may share a common set of access preferences with UE 115-*d*, may know a registration and connection management state of UE 115-*d* for one or more accesses, and may use this information to determine which access UE 115-*d* will select for transmitting the control plane signaling. In some examples, AMF 503 receives the signaling over an unexpected access, in which case, AMF 503 may retransmit the set of access preferences stored at AMF 503 to UE 115-*d*.

In some examples, UE 115-*d* may renegotiate access preferences with AMF 503. For instance, UE 115-*d* may generate new access preferences for certain control plane service—e.g., based on channel conditions, channel traffic, etc.—and may transmit the updated access to AMF 503, similar to the discussion at 510 and 515. In another instance, UE 115-*d* may receive a new set of access preferences from AMF 503—e.g., based on channel conditions, channel traffic, etc.—and may update access preferences at UE 115-*d*. In some examples UE 115-*d* and AMF 503 may renegotiate access preferences using NAS signaling procedures such as a re-registration procedure or a UE configuration update procedure.

Figure 6:
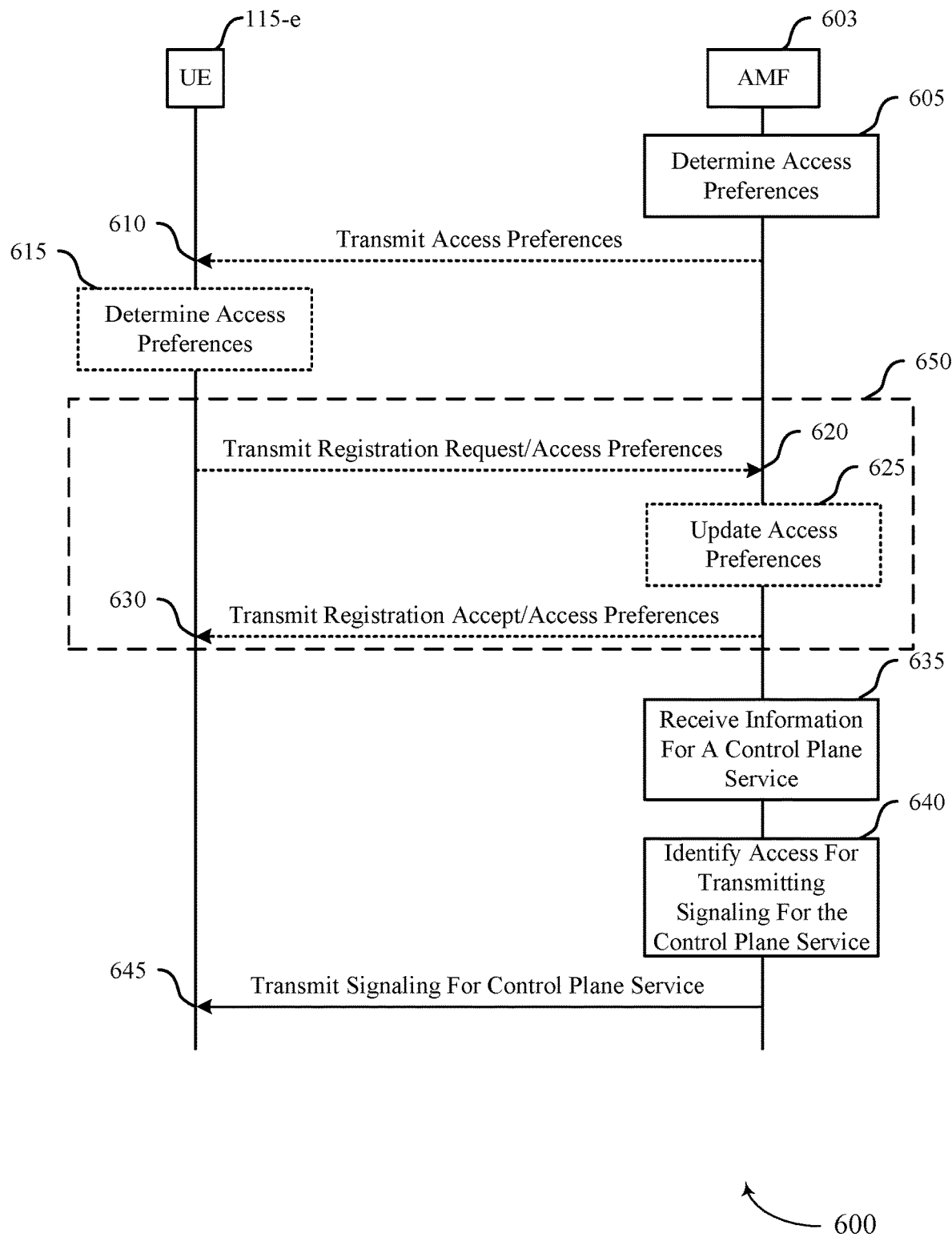

FIG. 6 shows a diagram 600 illustrating an example of control plane service delivery in accordance with one or more aspects of the present disclosure. Features of diagram 600 may be performed by UE 115-*e* and AMF 603, which may be an example of a UE 115 and an AMF 210, 310, 410, or 503 described above with reference to FIGS. 2-5. In some examples, a UE and n AMF, such as UE 115-*e* and AMF 603, may exchange control signaling based on preferences for signaling control information for a control plane service over certain accesses.

At 605, AMF 603 may determine access preferences for communicating signaling for a control plane service over certain access. In some aspects, AMF 603 may determine access preferences based on predetermined network parameters, preferences received from UE 115-*e*, channel conditions (e.g., network traffic), or any combination thereof.

At 610 to 630, AMF 603 and UE 115-*e* may negotiate access preferences for communicating control plane service signaling, as discussed at 505 to 530 in FIG. 4 and generally discussed herein. For instance, UE 115-*e* may indicate to AMF 603 a preferred access or access type or a prioritized set of accesses for communicating a control plane service. In some aspects, AMF 603 may update stored access preferences based on the received access preferences. In other aspects, AMF 603 may overrule the access preferences received from UE 115-*e*. In some examples, AMF 603 and UE 115-*e* may similarly renegotiate access preferences as discussed in 510 to 530.

At 635, AMF 603 may receive information for a control plane service. For instance, data for a UE configuration update service may be generated by an application within AMF 603. In some aspects, AMF 603 may receive information for a control plane service from another network entity, such as an SMF or UPF.

At 640, AMF 603 may identify an access for transmitting the control plane service information to UE 115-*e*. In some aspects, AMF 603 may identify the access based on the predetermined or negotiated preferences stored at AMF 603. In some aspects, AMF 603 may overrule access preferences for when an access is unavailable. For instance, AMF 603 may refrain from transmitting over a 3GPP access that is in an idle when a non-3GPP is in a connected state. In another instance, AMF 603 may overrule a preference received in control plane service information when the preferred access is unavailable and identify an available access.

At 645, AMF 603 may transmit signaling for a control plane service to UE 115-*e* over an access based on the access preferences at AMF 603 and/or the access(es) preferences of UE 115-*e*. In some aspects, UE 115-*e* may expect to receive the signaling for the control plane service over the selected access. For instance, UE 115-*e* may share a common set of access preferences with AMF 603, may know a registration and connection management state of UE 115-*e* for one or more accesses, and may use this information to determine which access AMF 603 will select for transmitting the control plane signaling.

Figure 7:
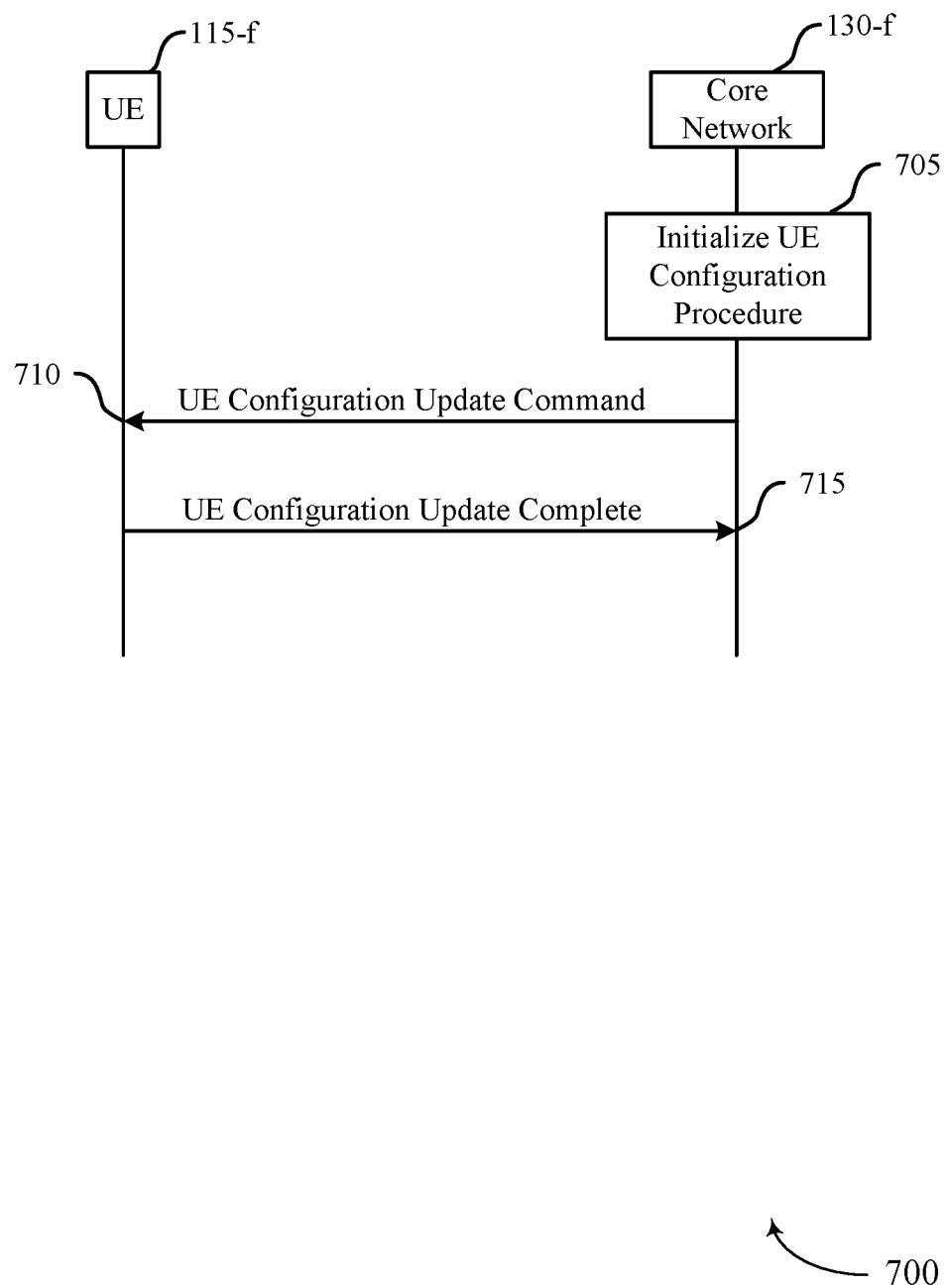

FIG. 7 shows a diagram 700 illustrating an example of control plane service delivery in accordance with one or more aspects of the present disclosure. Features of diagram 700 may be performed by UE 115-*f*, and core network 130-*f*, which may be an example of a UE 115 and a core network 130 described above with reference to FIGS. 1-4. In some examples, a core network, such as core network 130-*f*, may indicate to a UE, such as UE 115-*f*, access preferences for communicating control plane signaling for a control plane service during a UE configuration update. In some examples, a UE configuration procedure may be initialized by core network 130-*f* to facilitate the renegotiation of access preferences for control plane signaling.

At 705, an AMF at core network 130-*f* may initialize a UE configuration procedure. In some aspects, the UE configuration procedure is initialized due to a UE mobility change, based on network policy, due to a UE subscription change, or based on control plane service information. Control plane service information may include access preferences for communicating control plane signaling for one or more control plane services or control plane service groups. In some aspects, the UE configuration procedure is initialized when core network 130-*f* wants to change the UE configuration. For instance, core network 130-*f* may direct the AMF to initialize this procedure if core network 130-*f* has determined new access preferences for control plane signaling.

At 710, core network 130-*f* may transmit a UE configuration update command to UE 115-*f* In some aspects, the UE configuration update command may include the control plane service information. The UE configuration update command may also include mobility restrictions, a 5G-GUTI, a tracking area identifier (TAI), NSSAI information, and policy information.

At 715, UE 115-*f* may transmit a UE configuration update command to core network 130-*f*. In some aspects, UE 115-*f* may include control plane service information.

Figure 8:
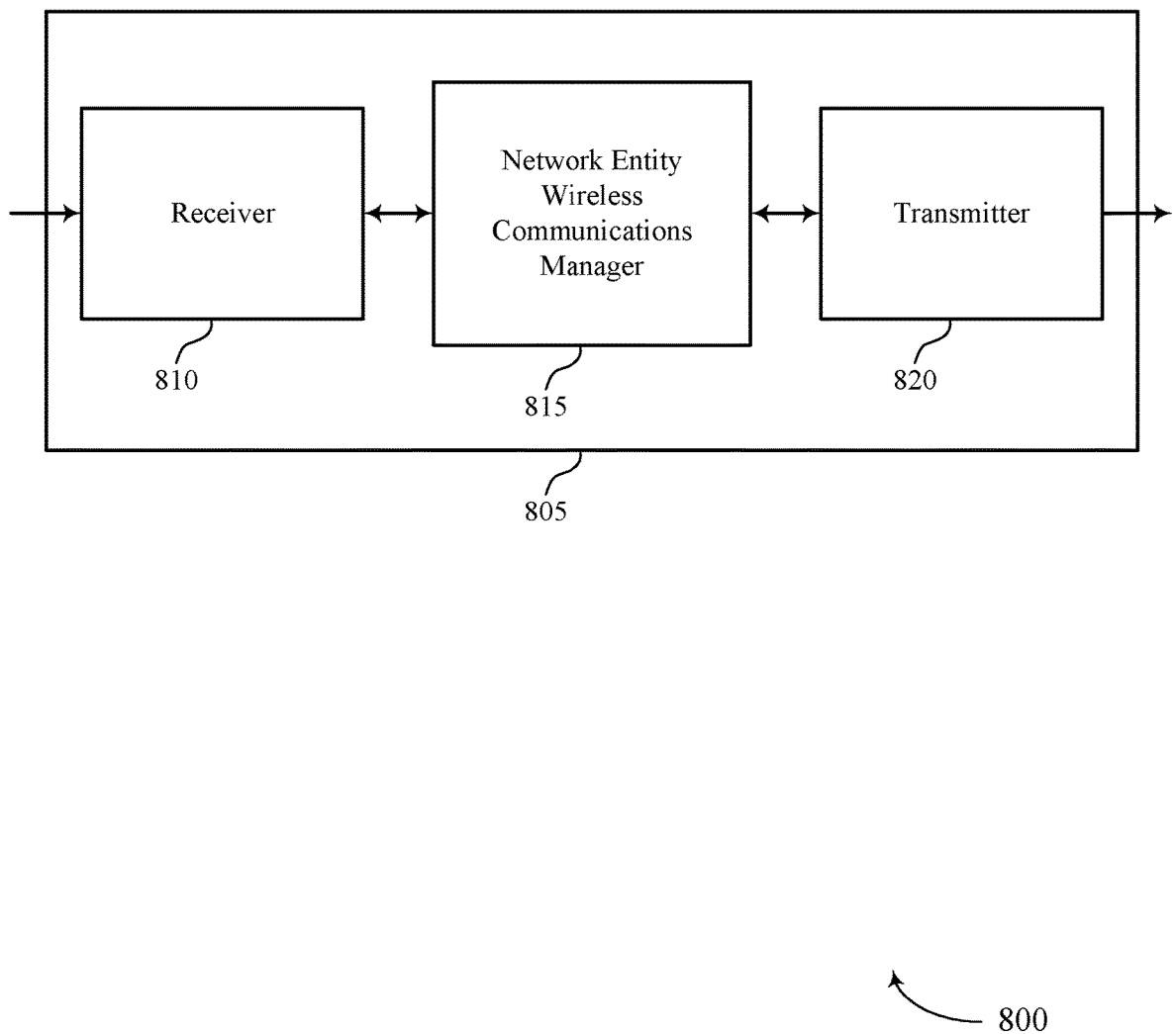
FIGS. 8 and 9 show block diagrams of a device that supports delivery of control plane services in multi-access systems in accordance with aspects of the present disclosure.

FIG. 8 shows a block diagram 800 of a wireless device 805 that supports delivery of control plane services in multi-access systems in accordance with aspects of the present disclosure. Wireless device 805 may be an example of aspects of a network entity, such as an, such as an AMF 210, AMF 310, AMF 410, AMF 503, or AMF 603, as described with reference to FIGS. 1-6. Wireless device 805 may include receiver 810, network entity wireless communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to delivery of control plane services in multi-access systems, etc.). Information may be passed on to other components of the device. The receiver 810 may be an example of aspects of the transceiver 1035 described with reference to FIG. 10. The receiver 810 may utilize a single antenna or a set of antennas.

Network entity wireless communications manager 815 may be an example of aspects of the network entity wireless communications manager 1015 described with reference to FIG. 10.

Network entity wireless communications manager 815 and/or at least some of its various sub-components may be implemented in hardware, software executed by a processor, firmware, or any combination thereof. If implemented in software executed by a processor, the functions of the network entity wireless communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The network entity wireless communications manager 815 and/or at least some of its various sub-components may be physically located at various positions, including being distributed such that portions of functions are implemented at different physical locations by one or more physical devices. In some examples, network entity wireless communications manager 815 and/or at least some of its various sub-components may be a separate and distinct component in accordance with various aspects of the present disclosure. In other examples, network entity wireless communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Network entity wireless communications manager 815 may identify a first access and a second access each associated with a UE. Network entity wireless communications manager 815 may also identify data for a control plane service associated with the UE, determine whether the first access or the second access is a preferred access for communicating signaling for the control plane service. Network entity wireless communications manager 815 may also transmit (e.g., using transmitter 820), to the UE, signaling for the control plane service over the first access or the second access based on determining whether the first access or the second access is the preferred access.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
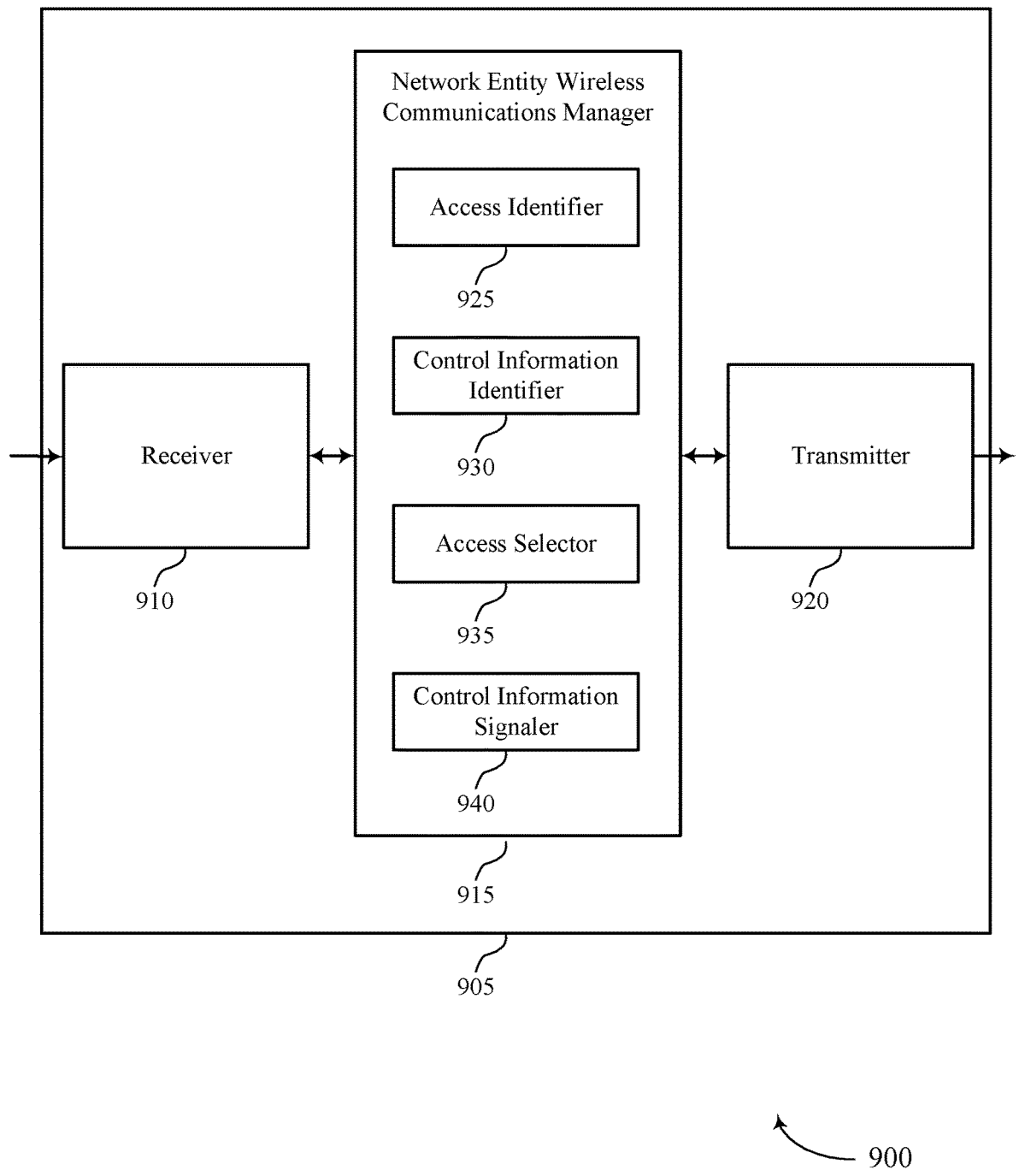

FIG. 9 shows a block diagram 900 of a wireless device 905 that supports delivery of control plane services in multi-access systems in accordance with aspects of the present disclosure. Wireless device 905 may be an example of aspects of a wireless device 805 or a network entity, such as an AMF 210, AMF 310, AMF 410, AMF 503, or AMF 603, as described with reference to FIGS. 1-6 and 8. Wireless device 905 may include receiver 910, network entity wireless communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to delivery of control plane services in multi-access systems, etc.). Information may be passed on to other components of the device. The receiver 910 may be an example of aspects of the transceiver 1035 described with reference to FIG. 10. The receiver 910 may utilize a single antenna or a set of antennas. In some aspects, receiver 910 may pass information to control information identifier 930. For instance, receiver 910 may pass a digital representation of a received signal that comprises control information to control information identifier 930. In some aspects, control information identifier 930 may receive an analog waveform including control information directly.

Network entity wireless communications manager 915 may be an example of aspects of the network entity wireless communications manager 1015 described with reference to FIG. 10.

Network entity wireless communications manager 915 may also include access identifier 925, control information identifier 930, access selector 935, and control information signaler 940.

Access identifier 925 may identify a first access and a second access each associated with a UE.

Access identifier 925 may also determine that the UE is in a registered state and a connected state for the first access. In some aspects, access selector 935 may determine whether the first access or the second access is the preferred access is based on the UE being in the registered and the connected state for the first access.

Access identifier 925 may also determine that the UE is in a deregistered state and an unconnected state for the first access and a registered state and a connected state for the second access. In some aspects, access selector 935 may determine determining whether the first access or the second access is the preferred access is based on determining that the UE is in the deregistered state and the unconnected state for the first access and the registered state and the connected state for the second access. And in some aspects, control information signaler 940 may transmit the signaling for the control plane service includes transmitting the signaling for the control plane service over the second access based on determining that the first access is not the preferred access.

Access identifier 925 may determine that the first access is unavailable for the signaling for the control plane service, and determine that the first access is unavailable for the signaling for the control plane service. In some aspects, control information signaler 940 may transmit the signaling for the control plane service over the second access based on determining that the first access is unavailable.

Access identifier 925 may determine that the first access is unavailable for the signaling for the control plane service. In some aspects, control information signaler 940 may transmit the signaling for the control plane service over the second access based on determining that the first access is unavailable Control information identifier 930 may identify data for a control plane service associated with the UE. Control information identifier 930 may also receive an indicator of a preferred access type for delivering data from the second network entity (e.g., an SMF 215 of FIG. 2), where the identifying the data includes identifying the data received from a second network entity. Control information identifier 930 may also receive, from the UE, second signaling for the control plane service over the first access after transmitting the indication that communications for the control plane service are barred on the first access, and control information signaler 940 may transmit, to the UE, reconfiguration information based on receiving the second signaling. In some aspects, access selector 935 determines whether the first access or the second access is the preferred access based on determining that communications for the control plane service are barred on the first access. Control information identifier 930 may also receive, from the UE, at least one regenerated preference level for communication signaling for the control plane service. Control information identifier 930 may also receive, from the UE, a request to renegotiate a preference level for communicating signaling for the control plane service. In some aspects, control information identifier 930 receives the indicator of the preferred access type with the data for the control plane service. In some aspects, the control plane service is a non-PDU service.

Access selector 935 may determine whether the first access or the second access is a preferred access for communicating signaling for the control plane service, receive, from the UE, a preference indicator for communicating the signaling for the control plane service over the first access, where determining whether the first access or the second access is the preferred access is based on the preference indicator. In some examples, access selector 935 may select, for the control plane service, a first preference level of the first access and a second preference level of the second access based on a preference indicator indicated by the UE, subscription information for the UE, a type of the UE, a capability of the UE, a registration and connection management state of the UE, an origin of the data, network parameters, or any combination thereof, where determining whether the first access or the second access is the preferred access is based on selecting the first preference level and the second preference level.

Access selector 935 may receive, from the UE, a request restricting communications for the control plane service from being performed on the first access, where determining whether the first access or the second access is the preferred access includes determining that the second access is the preferred access based on the request. In some aspects, control information signaler 940 may transmit the signaling for the control plane over the second access based on determining that the second access is preferred. Access selector 935 may also receive, from the UE, a request restricting communications for the control plane service from being performed on the first access, and may overrule the request based on a network parameter, where determining whether the first access or the second access is the preferred access includes determining that the first access is preferred based on overruling the request.

Access selector 935 may also determine that communications for the control plane service are barred on the first access, and modify the preference level for the control plane service based on the request. In some aspects, when determining whether the first access or the second access is the preferred access, access selector 935 determines that the first access is the preferred access, and control information signaler 940 transmits the signaling for the control plane over the second access based on determining that the first access is the preferred access (e.g., when the first access is unavailable). In some aspects, access selector 935 determines that the first access or the second access is the preferred access based on determining that the first access is of a preferred access type.

Control information signaler 940 may transmit, to the UE, signaling for the control plane service over the first access or the second access based on determining whether the first access or the second access is the preferred access. Control information signaler 940 may also transmit, to the UE, an indication of the first preference level of the first access, or the second preference level of the second access, or both. In some aspects, control information signaler 940 may transmit, to the second network entity, an indication that the access is unavailable. In some aspects, access selector 935 may determine whether the first access or the second access is the preferred access based on determining that the first access is of the preferred access type. Control information signaler 940 may also transmit, to the UE, an indication that the request has been overruled, where transmitting the signaling for the control plane service includes transmitting the signaling over the first access based on overruling the request. Control information signaler 940 may also transmit, to the UE, an indication that communications for the control plane service are barred on the first access.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas. In some aspects, control information signaler 940 transmits control information signaling using transmitter 920. For instance, control information signaler 940 may send a representation of control information to transmitter 920, which may convert the representation of the control information into an analog waveform. In some aspects, transmitter 920 may map the representation of control information to time and frequency resources before transmitting. In some aspects, control information signaler 940 may transmit control information directly without using transmitter 920.

Figure 10:
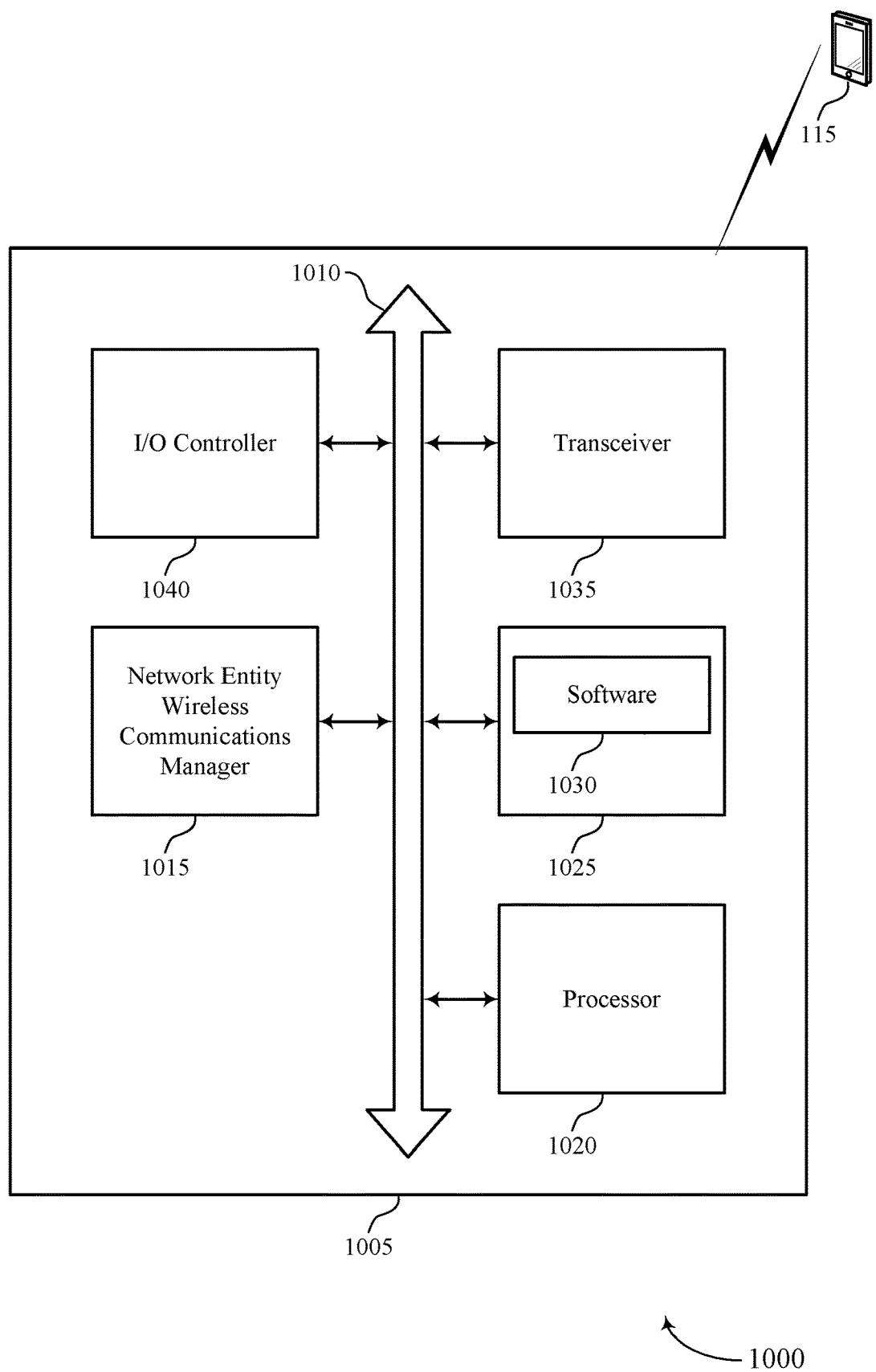
FIG. 10 illustrates a block diagram of a system including a network entity that supports delivery of control plane services in multi-access systems in accordance with aspects of the present disclosure.

FIG. 10 shows a diagram of a system 1000 including a device 1005 that supports delivery of control plane services in multi-access systems in accordance with aspects of the present disclosure. Device 1005 may be an example of or include the components of wireless device 805, wireless device 905, or a network entity, such as an AMF 210, AMF 310, AMF 410, AMF 503, or AMF 603, as described with reference to FIGS. 1-6, 8, and 9. Device 1005 may include components for bi-directional voice and data communications including components for transmitting and receiving communications, including network entity wireless communications manager 1015, processor 1020, memory 1025, software 1030, transceiver 1035, and I/O controller 1040. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some aspects, processor 1020 may be configured to operate a memory array using a memory controller. In other aspects, a memory controller may be integrated into processor 1020. Processor 1020 may be configured to execute computer-readable instructions stored in a memory to perform various functions (e.g., functions or tasks supporting delivery of control plane services in multi-access systems).

Memory 1025 may include random access memory (RAM) and read only memory (ROM). The memory 1025 may store computer-readable, computer-executable software 1030 including instructions that, when executed, cause the processor to perform various functions described herein. In some aspects, the memory 1025 may contain, among other things, a basic input/output system (BIOS) which may control basic hardware or software operation such as the interaction with peripheral components or devices.

Software 1030 may include code to implement aspects of the present disclosure, including code to support delivery of control plane services in multi-access systems. Software 1030 may be stored in a non-transitory computer-readable medium such as system memory or other memory. In some aspects, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

I/O controller 1040 may manage input and output signals for device 1005. I/O controller 1040 may also manage peripherals not integrated into device 1005. In some aspects, I/O controller 1040 may represent a physical connection or port to an external peripheral. In some aspects, I/O controller 1040 may utilize an operating system such as iOS®, ANDROID®, MS-DOS®, MS-WINDOWS®, OS/2®, UNIX®, LINUX®, or another known operating system. In other aspects, I/O controller 1040 may represent or interact with a modem, a keyboard, a mouse, a touchscreen, or a similar device. In some aspects, I/O controller 1040 may be implemented as part of a processor. In some aspects, a user may interact with device 1005 via I/O controller 1040 or via hardware components controlled by I/O controller 1040.

Figure 11:
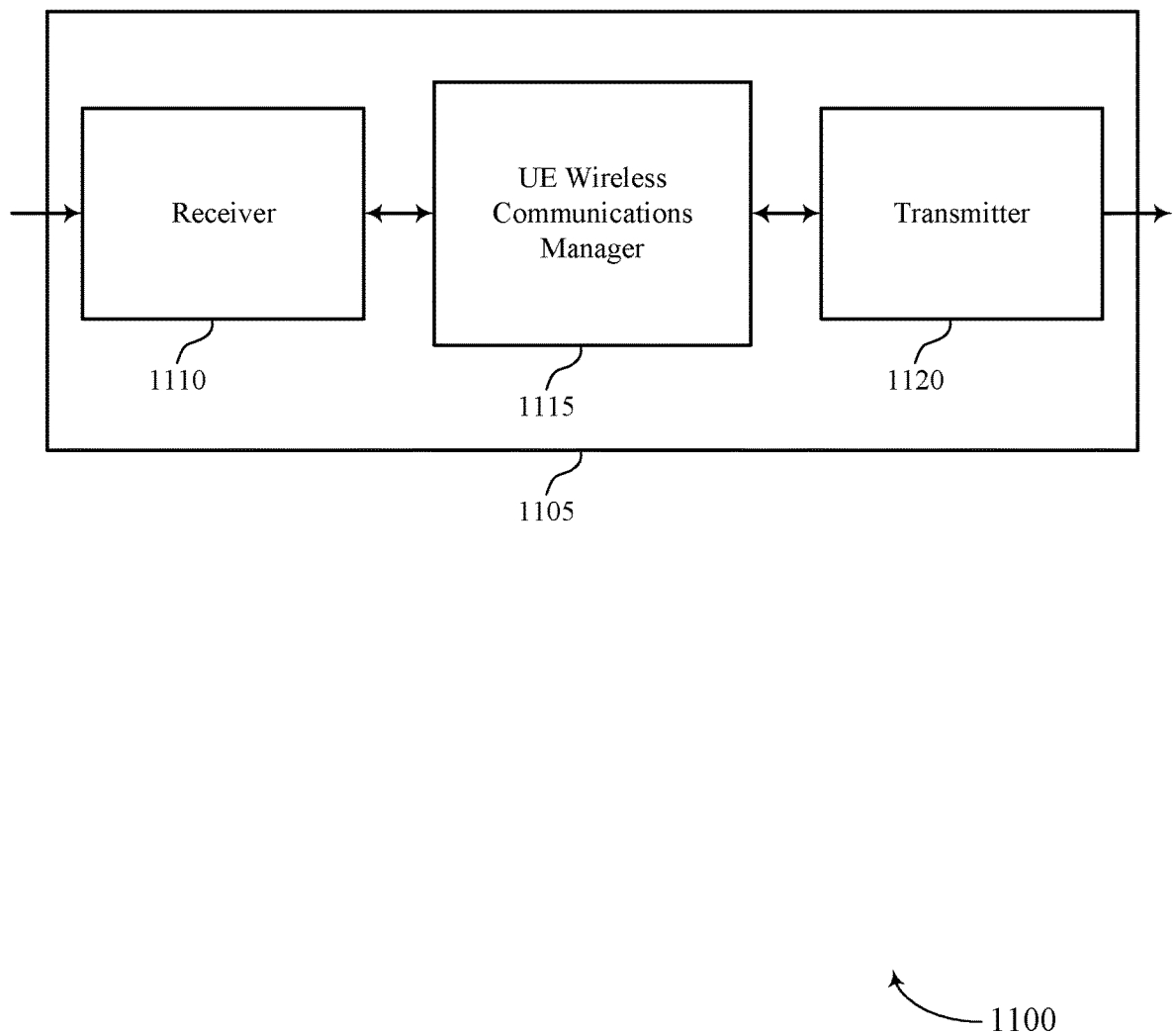
FIGS. 11 and 12 show block diagrams of a device that supports delivery of control plane services in multi-access systems in accordance with aspects of the present disclosure.

FIG. 11 shows a block diagram 1100 of a wireless device 1105 that supports delivery of control plane services in multi-access systems in accordance with aspects of the present disclosure. Wireless device 1105 may be an example of aspects of a UE 115 as described herein. Wireless device 1105 may include receiver 1110, UE wireless communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to delivery of control plane services in multi-access systems, etc.). Information may be passed on to other components of the device. The receiver 1110 may be an example of aspects of the transceiver 1335 described with reference to FIG. 13. The receiver 1110 may utilize a single antenna or a set of antennas.

UE wireless communications manager 1115 may be an example of aspects of the UE wireless communications manager 1315 described with reference to FIG. 13.

UE wireless communications manager 1115 and/or at least some of its various sub-components may be implemented in hardware, software executed by a processor, firmware, or any combination thereof. If implemented in software executed by a processor, the functions of the UE wireless communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE wireless communications manager 1115 and/or at least some of its various sub-components may be physically located at various positions, including being distributed such that portions of functions are implemented at different physical locations by one or more physical devices. In some examples, UE wireless communications manager 1115 and/or at least some of its various sub-components may be a separate and distinct component in accordance with various aspects of the present disclosure. In other examples, UE wireless communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE wireless communications manager 1115 may identify a first access and a second access each associated with a network entity. UE wireless communications manager 1115 may also receive, from the network entity, signaling for a control plane service over the first access or the second access based on whether the first access or the second access is a preferred access for communicating signaling for the control plane service.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
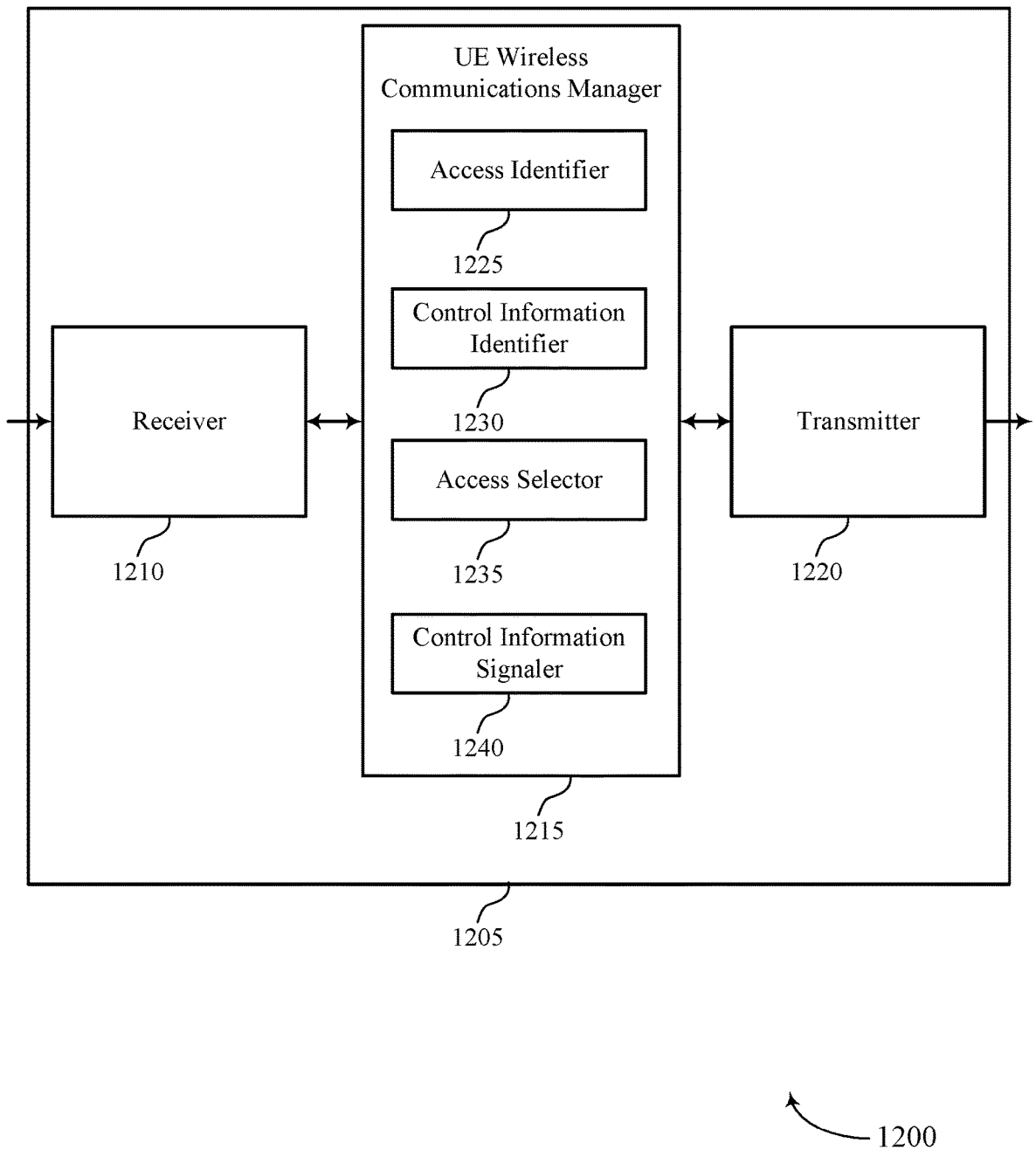

FIG. 12 shows a block diagram 1200 of a wireless device 1205 that supports delivery of control plane services in multi-access systems in accordance with aspects of the present disclosure. Wireless device 1205 may be an example of aspects of a wireless device 1105 or a UE 115 as described herein and with reference to FIG. 11. Wireless device 1205 may include receiver 1210, UE wireless communications manager 1215, and transmitter 1220. Wireless device 1205 may also include a processor. Each of these components may be in communication with one another (e.g., via one or more buses). In some aspects, receiver 1210 may pass information to control information identifier 1230. For instance, receiver 1210 may pass a digital representation of a received signal that comprises control information to control information identifier 1230. In some aspects, control information identifier 1230 may receive an analog waveform including control information directly.

Receiver 1210 may receive information such as packets, user data, or control information associated with various information channels (e.g., control channels, data channels, and information related to delivery of control plane services in multi-access systems, etc.). Information may be passed on to other components of the device. The receiver 1210 may be an example of aspects of the transceiver 1335 described with reference to FIG. 13. The receiver 1210 may utilize a single antenna or a set of antennas.

UE wireless communications manager 1215 may be an example of aspects of the UE wireless communications manager 1315 described with reference to FIG. 13. UE wireless communications manager 1215 may also include access identifier 1225, control information identifier 1230, access selector 1235, and control information signaler 1240.

Access identifier 1225 may identify a first access and a second access each associated with a network entity and determine that the first access is unavailable, where determining whether the first access or the second access is the preferred access is based at least in part determining that the first access is unavailable.

Control information identifier 1230 may receive, from the network entity, signaling for a control plane service over the first access or the second access based on whether the first access or the second access is a preferred access for communicating signaling for the control plane service. Control information identifier 1230 may also identify data for the control plane service, receive, from the network entity, an indication that the request has been overruled, where receiving signaling for the control plane service includes receiving the signaling over the first access. Control information identifier 1230 may also receive, from the network entity, an indication that communications for the control plane service are restricted from being performed on the first access, where receiving the signaling includes receiving the signaling over the second access after receiving the indication, and receive, from the network entity, reconfiguration information.

Access selector 1235 may generate, for each control plane service of a set of control plane services that includes the control plane service, at least one preference level for communicating control plane signaling based on a preconfigured parameters, a network-provided parameter, network traffic, or any combination thereof. Access selector 1235 may also determine whether the first access or the second access is the preferred access. In some aspects, access selector 1235 may regenerate the at least one preference level, where receiving signaling for the control plane service includes receiving signaling over the first access based on the first preference level being higher than the second preference level. In some examples, access selector 1235 may also regenerate a first preference level for the first access and a second preference level for the second access based on the reconfiguration information, the regenerated first preference level being lower than the regenerated second preference level. Access selector 1235 may identify a renegotiated preference level for the control plane service based on the renegotiation. In some aspects, generating the at least one preference level includes generating a first preference level for the first access and the control plane service and a second preference level for the first access and the control plane service, receiving signaling for the control plane service includes receiving signaling over the first access based on the first preference level being higher than the second preference level.

Control information signaler 1240 may transmit, to the network entity during a registration management procedure, a preference indicator for communicating the signaling for the control plane service over the first access or the second access. Control information signaler 1240 may also transmit, to the network entity, second signaling for the control plane service over the first access based on determining whether the first access or the second is the preferred access. Control information signaler 1240 may also transmit, to the network entity, second signaling associated with the control plane service over the second access based on the determining. Control information signaler 1240 may also transmit, to the network entity, a request restricting communications for the control plane service from being performed on the first access, where receiving signaling for the control plane service includes receiving the signaling over the second access based on the request. Control information signaler 1240 may also transmit, from the UE, second signaling associated with the control plane service over the first access after receiving the indication, and transmit, to the network entity, a request to renegotiate a preference level for communicating signaling for the control plane service.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1335 described with reference to FIG. 13. The transmitter 1220 may utilize a single antenna or a set of antennas. In some aspects, control information signaler 1240 transmits control information signaling using transmitter 1220. For instance, control information signaler 1240 may send a representation of control information to transmitter 1220, which may convert the representation of the control information into an analog waveform. In some aspects, transmitter 1220 may map the representation of control information to time and frequency resources before transmitting. In some aspects, control information signaler 1240 may transmit control information directly without using transmitter 1220.

Figure 13:
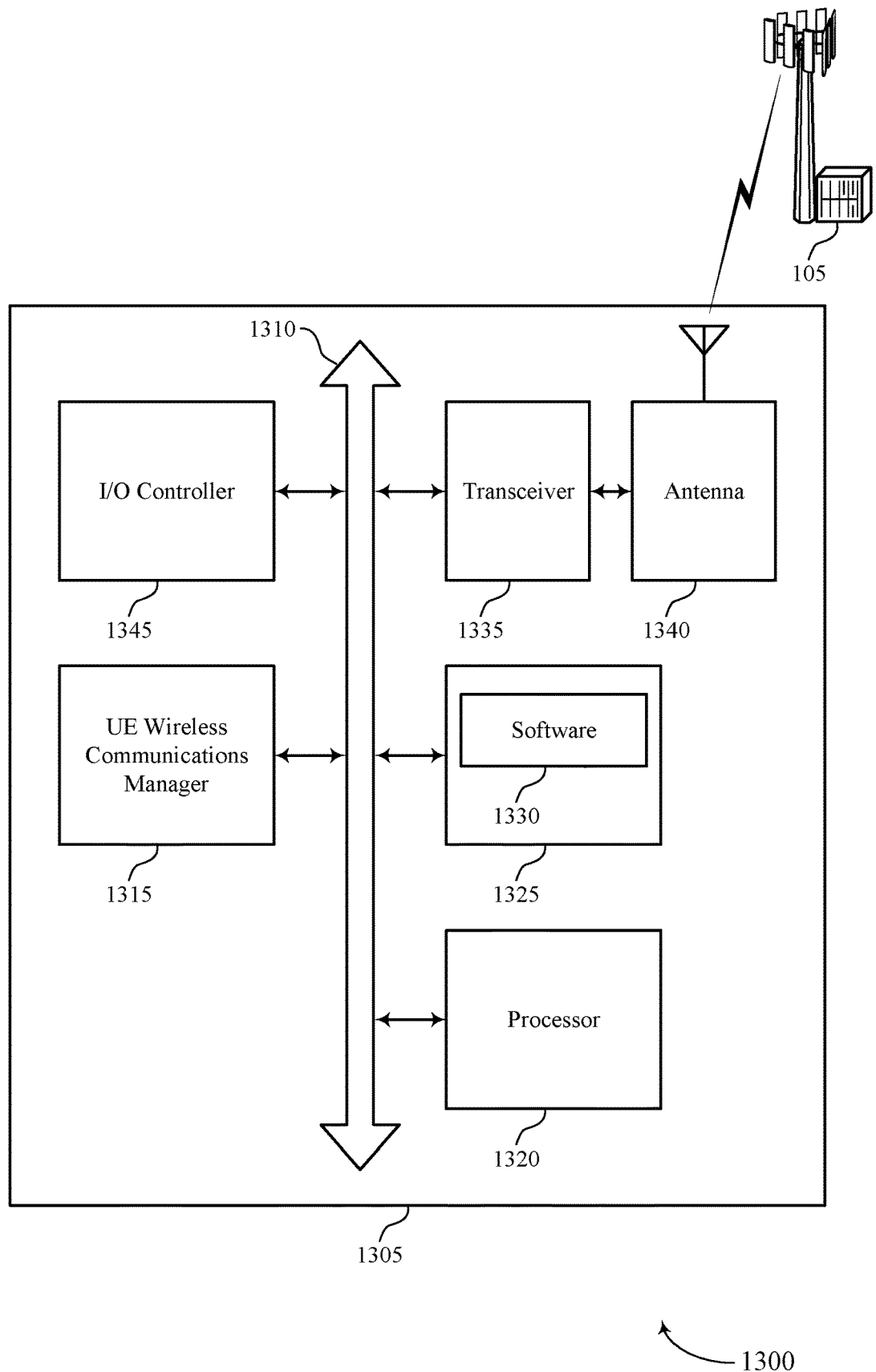
FIG. 13 illustrates a block diagram of a system including a user equipment (UE) that supports delivery of control plane services in multi-access systems in accordance with aspects of the present disclosure.

FIG. 13 shows a diagram of a system 1300 including a device 1305 that supports delivery of control plane services in multi-access systems in accordance with aspects of the present disclosure. Device 1305 may be an example of or include the components of UE 115 as described above, e.g., with reference to FIG. 1-7. Device 1305 may include components for bi-directional voice and data communications including components for transmitting and receiving communications, including UE wireless communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more network access devices 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 1320 may be configured to operate a memory array using a memory controller. In other aspects, a memory controller may be integrated into processor 1320. Processor 1320 may be configured to execute computer-readable instructions stored in a memory to perform various functions (e.g., functions or tasks supporting delivery of control plane services in multi-access systems).

Memory 1325 may include RAM and ROM. The memory 1325 may store computer-readable, computer-executable software 1330 including instructions that, when executed, cause the processor to perform various functions described herein. In some aspects, the memory 1325 may contain, among other things, a BIOS which may control basic hardware or software operation such as the interaction with peripheral components or devices.

Software 1330 may include code to implement aspects of the present disclosure, including code to support delivery of control plane services in multi-access systems. Software 1330 may be stored in a non-transitory computer-readable medium such as system memory or other memory. In some aspects, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some aspects, the wireless device may include a single antenna 1340. However, in some aspects the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some aspects, I/O controller 1345 may represent a physical connection or port to an external peripheral. In some aspects, I/O controller 1345 may utilize an operating system such as iOS®, ANDROID®, MS-DOS®, MS-WINDOWS®, OS/2®, UNIX®, LINUX®, or another known operating system. In other aspects, I/O controller 1345 may represent or interact with a modem, a keyboard, a mouse, a touchscreen, or a similar device. In some aspects, I/O controller 1345 may be implemented as part of a processor. In some aspects, a user may interact with device 1305 via I/O controller 1345 or via hardware components controlled by I/O controller 1345.

Figure 14:
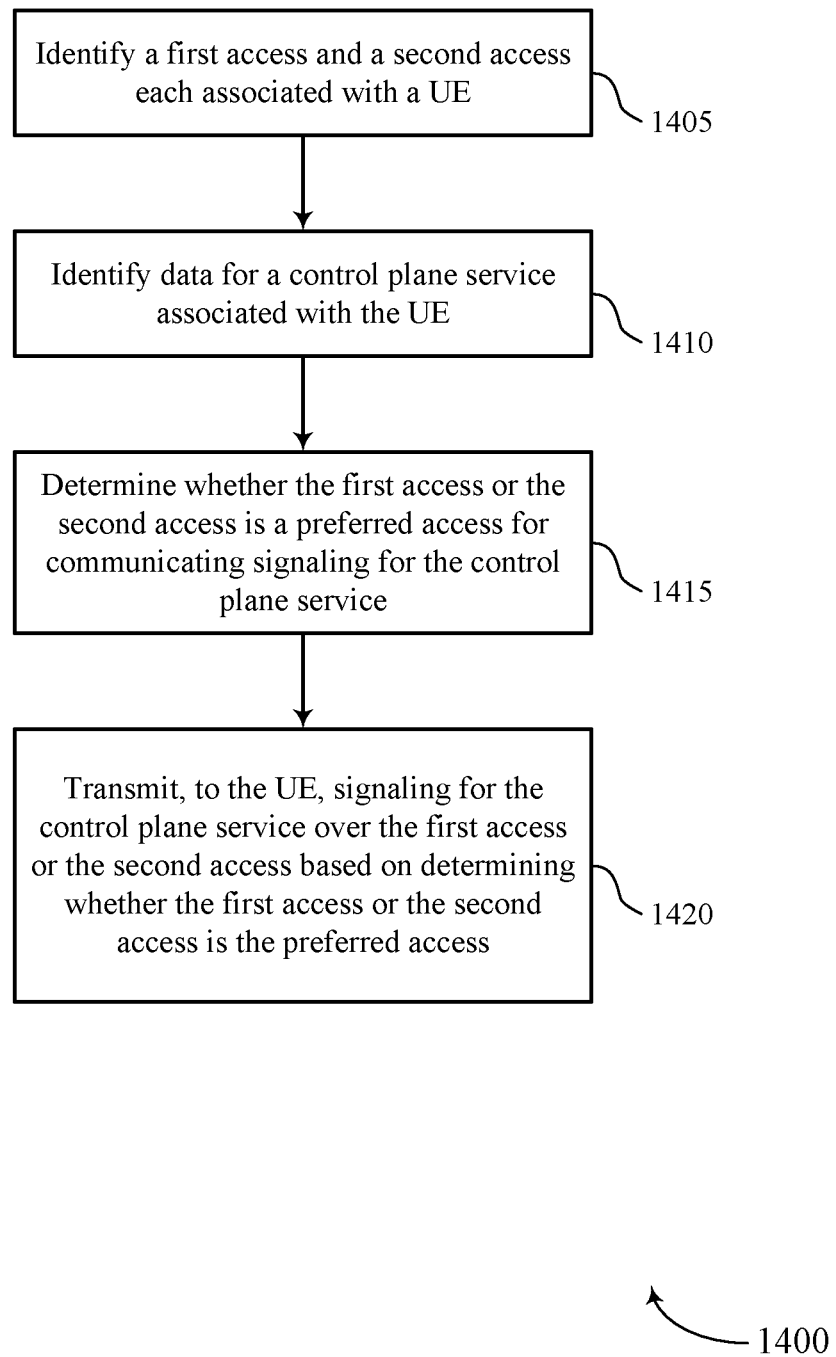
FIGS. 14 through 20 illustrate methods for delivery of control plane services in multi-access systems in accordance with aspects of the present disclosure.

FIG. 14 shows a flowchart illustrating a method 1400 for delivery of control plane services in multi-access systems in accordance with aspects of the present disclosure. The operations of method 1400 may be implemented by a network entity, such as an AMF 210, 310, 410, 503, or 603 or wireless device 805 or 905 as described with reference to FIGS. 1-6, 8, and 9. For example, the operations of method 1400 may be performed by a network entity wireless communications manager as described with reference to FIGS. 8 through 10. In some examples, a network entity may execute a set of codes to control the functional elements of the device to perform the functions described below. Additionally or alternatively, the network entity may perform aspects of the functions described below using special-purpose hardware.

At block 1405 the network entity may identify a first access and a second access each associated with a UE. The operations of block 1405 may be performed according to the methods described herein. In certain examples, aspects of the operations of block 1405 may be performed by an access identifier as described with reference to FIGS. 8 through 10.

At block 1410 the network entity may identify data for a control plane service associated with the UE. The operations of block 1410 may be performed according to the methods described herein. In certain examples, aspects of the operations of block 1410 may be performed by a control information identifier as described with reference to FIGS. 8 through 10.

At block 1415 the network entity may determine whether the first access or the second access is a preferred access for communicating signaling for the control plane service. The operations of block 1415 may be performed according to the methods described herein. In certain examples, aspects of the operations of block 1415 may be performed by an access selector as described with reference to FIGS. 8 through 10.

At block 1420 the network entity may transmit, to the UE, signaling for the control plane service over the first access or the second access based at least in part on determining whether the first access or the second access is the preferred access. The operations of block 1420 may be performed according to the methods described herein. In certain examples, aspects of the operations of block 1420 may be performed by a control information signaler as described with reference to FIGS. 8 through 10.

Figure 15:
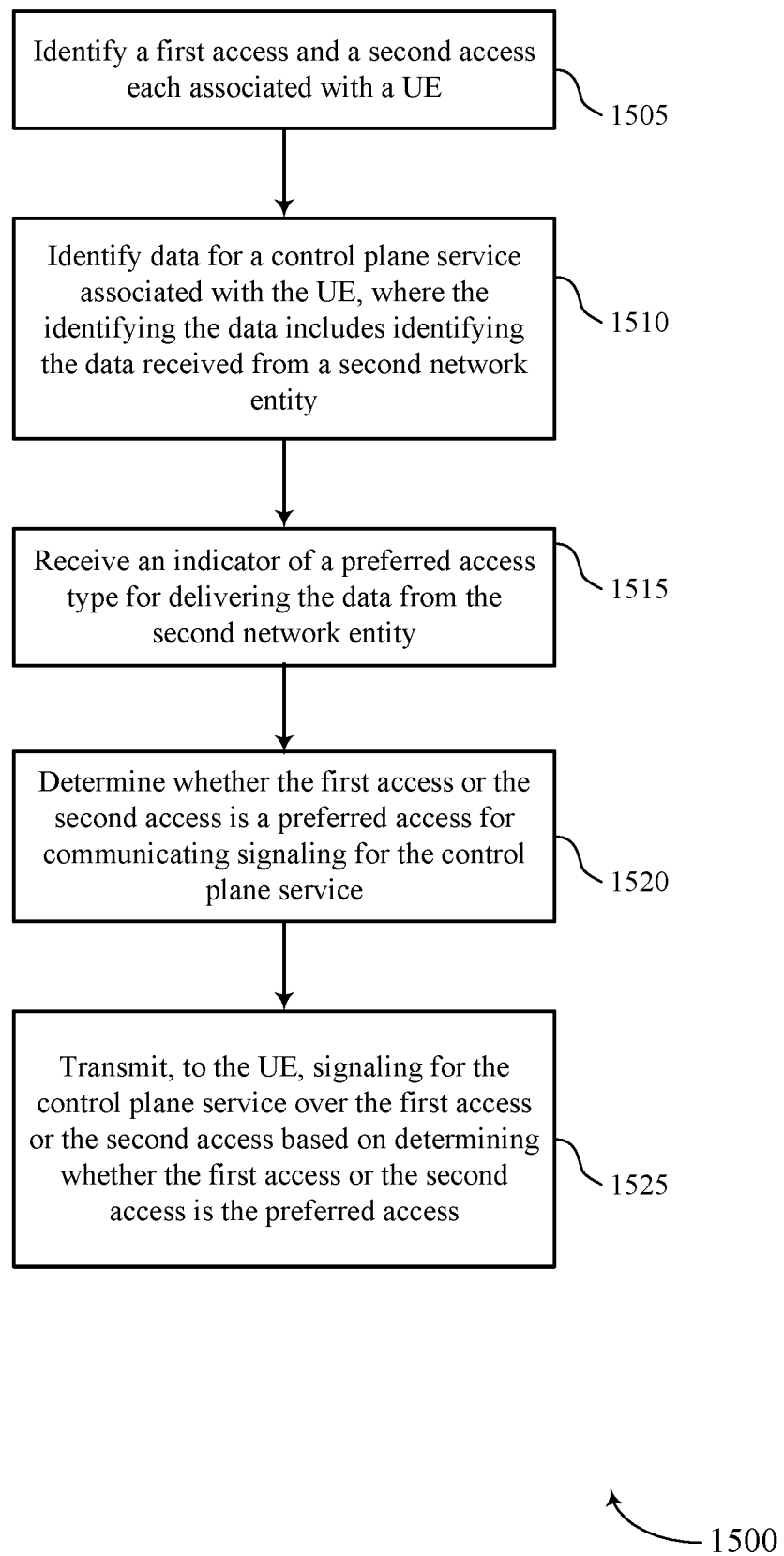

FIG. 15 shows a flowchart illustrating a method 1500 for delivery of control plane services in multi-access systems in accordance with aspects of the present disclosure. The operations of method 1500 may be implemented by a network entity, such as an AMF 210, 310, 410, 503, or 603 or wireless device 805 or 905 as described with reference to FIGS. 1-6, 8, and 9. For example, the operations of method 1500 may be performed by a network entity wireless communications manager as described with reference to FIGS. 8 through 10. In some examples, a network entity may execute a set of codes to control the functional elements of the device to perform the functions described below. Additionally or alternatively, the network entity may perform aspects of the functions described below using special-purpose hardware.

At block 1505 the network entity may identify a first access and a second access each associated with a UE. The operations of block 1505 may be performed according to the methods described herein. In certain examples, aspects of the operations of block 1505 may be performed by an access identifier as described with reference to FIGS. 8 through 10.

At block 1510 the network entity may identify data for a control plane service associated with the UE, wherein the identifying the data comprises identifying the data received from a second network entity. The operations of block 1510 may be performed according to the methods described herein. In certain examples, aspects of the operations of block 1510 may be performed by a control information identifier as described with reference to FIGS. 8 through 10.

At block 1515 the network entity may receive an indicator of a preferred access type for delivering the data from the second network entity. The operations of block 1515 may be performed according to the methods described herein. In certain examples, aspects of the operations of block 1515 may be performed by a control information identifier as described with reference to FIGS. 8 through 10.

At block 1520 the network entity may determine whether the first access or the second access is a preferred access for communicating signaling for the control plane service. The operations of block 1520 may be performed according to the methods described herein. In certain examples, aspects of the operations of block 1520 may be performed by an access selector as described with reference to FIGS. 8 through 10.

At block 1525 the network entity may transmit, to the UE, signaling for the control plane service over the first access or the second access based at least in part on determining whether the first access or the second access is the preferred access. The operations of block 1525 may be performed according to the methods described herein. In certain examples, aspects of the operations of block 1525 may be performed by a control information signaler as described with reference to FIGS. 8 through 10.

Figure 16:
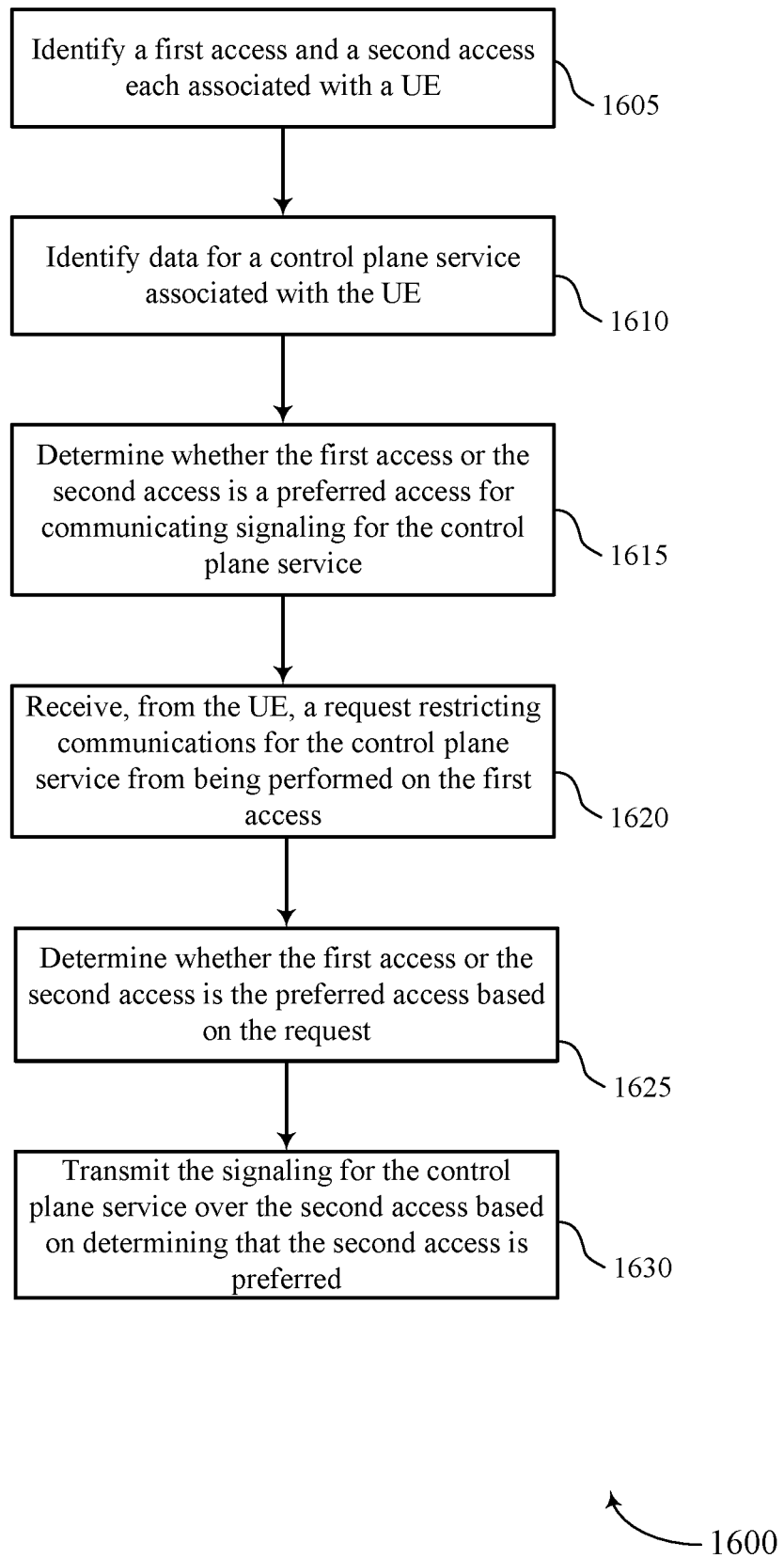

FIG. 16 shows a flowchart illustrating a method 1600 for delivery of control plane services in multi-access systems in accordance with aspects of the present disclosure. The operations of method 1600 may be implemented by a network entity, such as an AMF 210, 310, 410, 503, or 603 or wireless device 805 or 905 as described with reference to FIGS. 1-6, 8, and 9. For example, the operations of method 1600 may be performed by a network entity wireless communications manager as described with reference to FIGS. 8 through 10. In some examples, a network entity may execute a set of codes to control the functional elements of the device to perform the functions described below. Additionally or alternatively, the network entity may perform aspects of the functions described below using special-purpose hardware.

At block 1605 the network entity may identify a first access and a second access each associated with a UE. The operations of block 1605 may be performed according to the methods described herein. In certain examples, aspects of the operations of block 1605 may be performed by an access identifier as described with reference to FIGS. 8 through 10.

At block 1610 the network entity may identify data for a control plane service associated with the UE. The operations of block 1610 may be performed according to the methods described herein. In certain examples, aspects of the operations of block 1610 may be performed by a control information identifier as described with reference to FIGS. 8 through 10.

At block 1615 the network entity may determine whether the first access or the second access is a preferred access for communicating signaling for the control plane service. The operations of block 1615 may be performed according to the methods described herein. In certain examples, aspects of the operations of block 1615 may be performed by an access selector as described with reference to FIGS. 8 through 10.

At block 1620 the network entity may receive, from the UE, a request restricting communications for the control plane service from being performed on the first access. The operations of block 1620 may be performed according to the methods described herein. In certain examples, aspects of the operations of block 1620 may be performed by an access selector as described with reference to FIGS. 8 through 10.

At block 1625 the network entity may determine whether the first access or the second access is the preferred access is based at least in part on the request. The operations of block 1625 may be performed according to the methods described herein. In certain examples, aspects of the operations of block 1625 may be performed by an access selector as described with reference to FIGS. 8 through 10.

At block 1630 the network entity may transmit the signaling for the control plane service over the second access based at least in part on determining that the second access is preferred. The operations of block 1630 may be performed according to the methods described herein. In certain examples, aspects of the operations of block 1630 may be performed by a control information signaler as described with reference to FIGS. 8 through 10.

Figure 17:
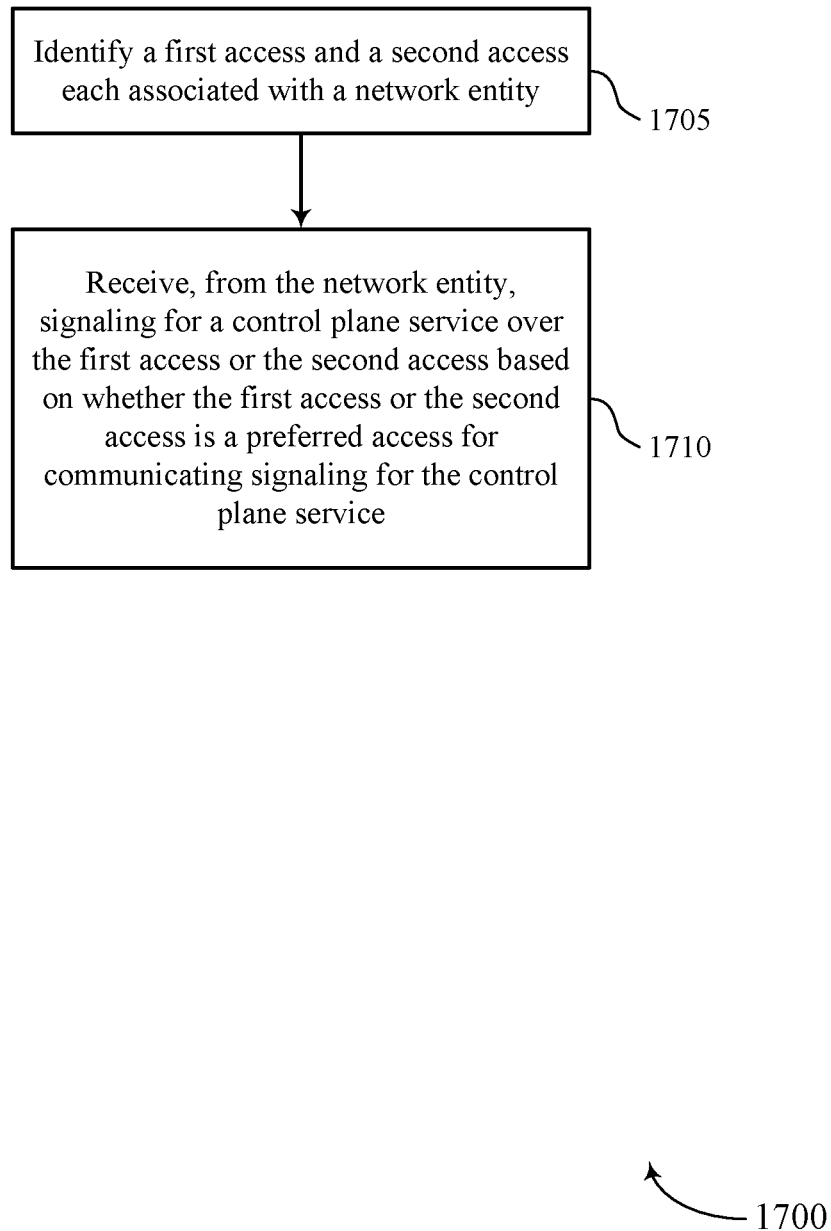

FIG. 17 shows a flowchart illustrating a method 1700 for delivery of control plane services in multi-access systems in accordance with aspects of the present disclosure. The operations of method 1700 may be implemented by a UE 115 or its components as described herein. For example, the operations of method 1700 may be performed by a UE wireless communications manager as described with reference to FIGS. 11 through 13. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a first access and a second access each associated with a network entity. The operations of block 1705 may be performed according to the methods described herein. In certain examples, aspects of the operations of block 1705 may be performed by an access identifier as described with reference to FIGS. 11 through 13.

At block 1710 the UE 115 may receive, from the network entity, signaling for a control plane service over the first access or the second access based at least in part on whether the first access or the second access is a preferred access for communicating signaling for the control plane service. The operations of block 1710 may be performed according to the methods described herein. In certain examples, aspects of the operations of block 1710 may be performed by a control information identifier as described with reference to FIGS. 11 through 13.

Figure 18:
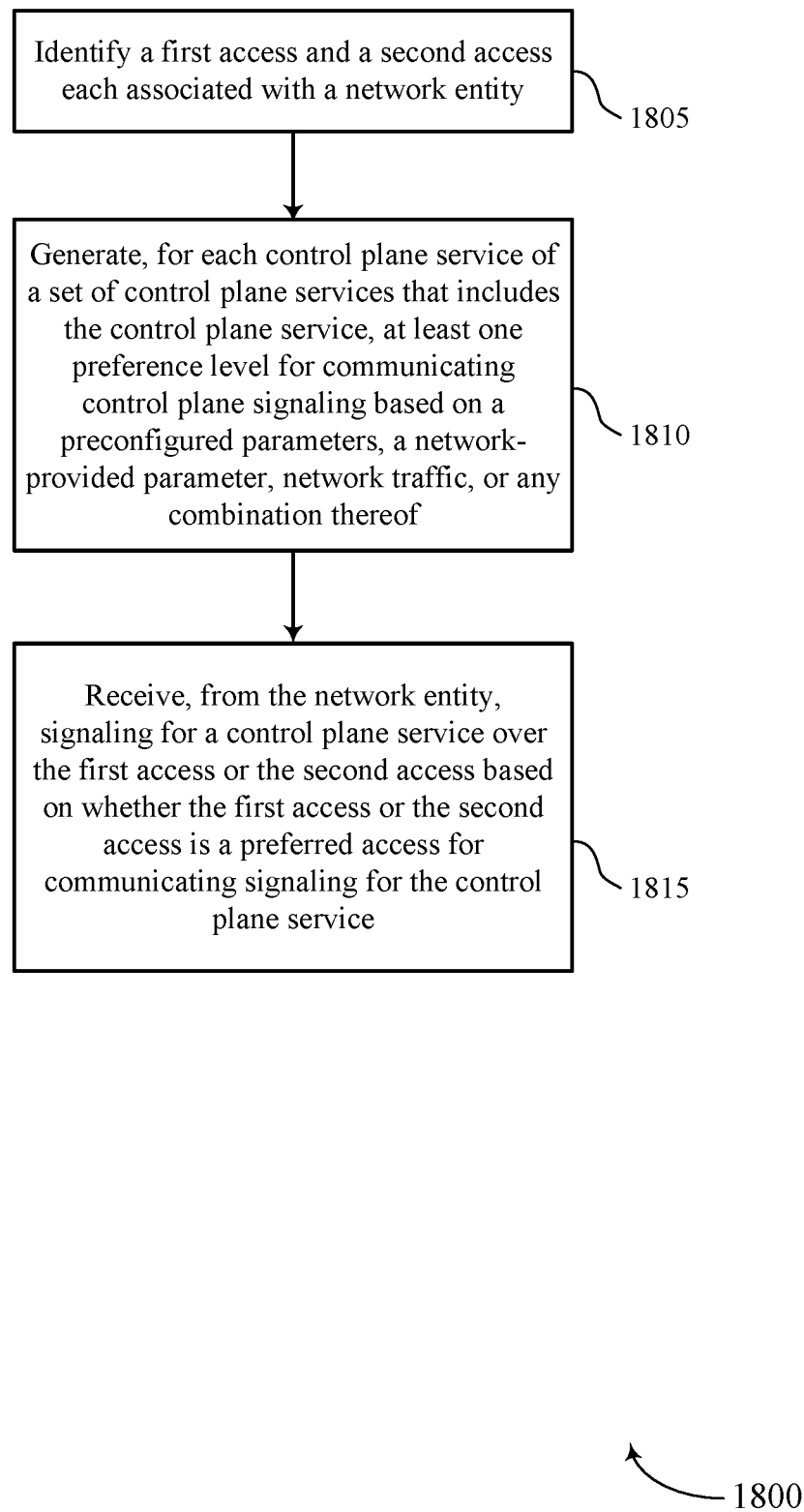

FIG. 18 shows a flowchart illustrating a method 1800 for delivery of control plane services in multi-access systems in accordance with aspects of the present disclosure. The operations of method 1800 may be implemented by a UE 115 or its components as described herein. For example, the operations of method 1800 may be performed by a UE wireless communications manager as described with reference to FIGS. 11 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a first access and a second access each associated with a network entity. The operations of block 1805 may be performed according to the methods described herein. In certain examples, aspects of the operations of block 1805 may be performed by an access identifier as described with reference to FIGS. 11 through 13.

At block 1810 the UE 115 may generate, for each control plane service of a plurality of control plane services that comprises the control plane service, at least one preference level for communicating control plane signaling based at least in part on a preconfigured parameters, a network-provided parameter, network traffic, or any combination thereof. The operations of block 1810 may be performed according to the methods described herein. In certain examples, aspects of the operations of block 1810 may be performed by an access selector as described with reference to FIGS. 11 through 13.

At block 1815 the UE 115 may receive, from the network entity, signaling for a control plane service over the first access or the second access based at least in part on whether the first access or the second access is a preferred access for communicating signaling for the control plane service. The operations of block 1815 may be performed according to the methods described herein. In certain examples, aspects of the operations of block 1815 may be performed by a control information identifier as described with reference to FIGS. 11 through 13.

Figure 19:
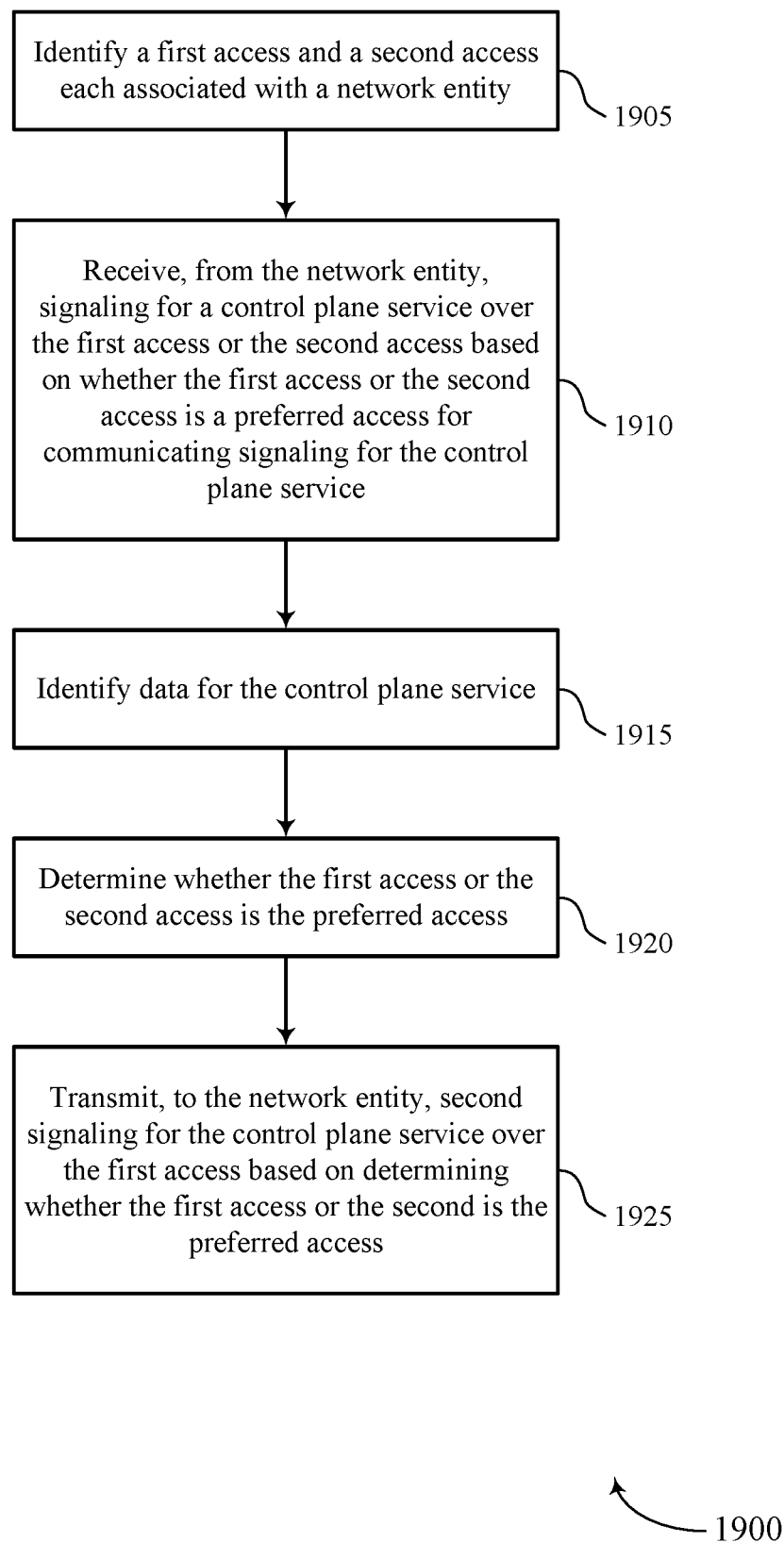

FIG. 19 shows a flowchart illustrating a method 1900 for delivery of control plane services in multi-access systems in accordance with aspects of the present disclosure. The operations of method 1900 may be implemented by a UE 115 or its components as described herein. For example, the operations of method 1900 may be performed by a UE wireless communications manager as described with reference to FIGS. 11 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify a first access and a second access each associated with a network entity. The operations of block 1905 may be performed according to the methods described herein. In certain examples, aspects of the operations of block 1905 may be performed by an access identifier as described with reference to FIGS. 11 through 13.

At block 1910 the UE 115 may receive, from the network entity, signaling for a control plane service over the first access or the second access based at least in part on whether the first access or the second access is a preferred access for communicating signaling for the control plane service. The operations of block 1910 may be performed according to the methods described herein. In certain examples, aspects of the operations of block 1910 may be performed by a control information identifier as described with reference to FIGS. 11 through 13.

At block 1915 the UE 115 may identify data for the control plane service. The operations of block 1915 may be performed according to the methods described herein. In certain examples, aspects of the operations of block 1915 may be performed by a control information identifier as described with reference to FIGS. 11 through 13.

At block 1920 the UE 115 may determine whether the first access or the second access is the preferred access. The operations of block 1920 may be performed according to the methods described herein. In certain examples, aspects of the operations of block 1920 may be performed by an access selector as described with reference to FIGS. 11 through 13.

At block 1925 the UE 115 may transmit, to the network entity, second signaling for the control plane service over the first access based at least in part on determining whether the first access or the second is the preferred access. The operations of block 1925 may be performed according to the methods described herein. In certain examples, aspects of the operations of block 1925 may be performed by a control information signaler as described with reference to FIGS. 11 through 13.

Figure 20:
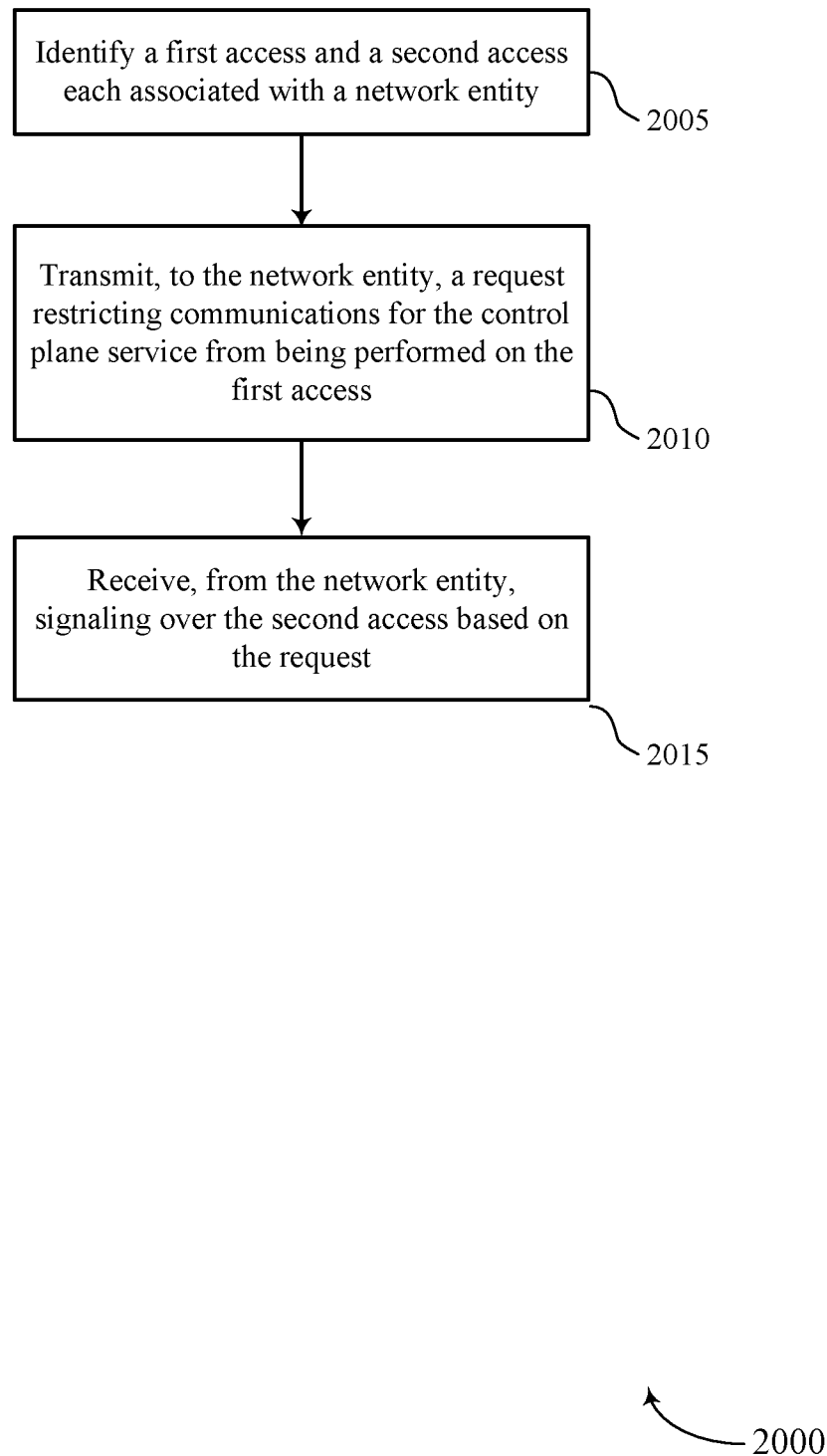

FIG. 20 shows a flowchart illustrating a method 2000 for delivery of control plane services in multi-access systems in accordance with aspects of the present disclosure. The operations of method 2000 may be implemented by a UE 115 or its components as described herein. For example, the operations of method 2000 may be performed by a UE wireless communications manager as described with reference to FIGS. 11 through 13. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify a first access and a second access each associated with a network entity. The operations of block 2005 may be performed according to the methods described herein. In certain examples, aspects of the operations of block 2005 may be performed by an access identifier as described with reference to FIGS. 11 through 13.

At block 2010 the UE 115 may transmit, to the network entity, a request restricting communications for the control plane service from being performed on the first access, wherein receiving signaling for the control plane service comprises receiving the signaling over the second access based at least in part on the request. The operations of block 2010 may be performed according to the methods described herein. In certain examples, aspects of the operations of block 2010 may be performed by a control information signaler as described with reference to FIGS. 11 through 13.

At block 2015 the UE 115 may receive, from the network entity, signaling for a control plane service over the second access based at least in part on the request. The operations of block 2015 may be performed according to the methods described herein. In certain examples, aspects of the operations of block 2015 may be performed by a control information identifier as described with reference to FIGS. 11 through 13.

It should be noted that these methods describe possible implementations, and that the operations may be rearranged or otherwise modified such that other implementations are possible. In some examples, aspects from two or more of the methods may be combined.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Additionally or alternatively, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as begin "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project." CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may additionally or alternatively be implemented, in whole or in part, with instructions embodied in a memory, formatted to be executed by one or more general or application-specific processors.

What is claimed is:

1. A method for wireless communication at a first network entity, comprising:
   identifying a first access via a first N1 signaling interface and a second access via a second N1 signaling interface each associated with a user equipment (UE), wherein the first N1 signaling interface is a different N1 signaling interface from the second N1 signaling interface;
   identifying data for a control plane service associated with the UE;
   determining whether the first access via the first N1 signaling interface or the second access via the second N1 signaling interface is a preferred access for communicating non-access stratum (NAS) signaling for the control plane service; and
   transmitting, to the UE, non-access stratum (NAS) signaling for the control plane service over the first access via the first N1 signaling interface or the second access via the second N1 signaling interface based at least in part on determining whether the first access via the first N1 signaling interface or the second access via the second N1 signaling interface is the preferred access.

2. The method of claim 1, further comprising:
   receiving, from the UE, a preference indicator for communicating the non-access stratum (NAS) signaling for the control plane service over the first access via the first N1 signaling interface, wherein determining whether the first access via the first N1 signaling interface or the second access via the second N1 signaling interface is the preferred access is based at least in part on the preference indicator.

3. The method of claim 1, further comprising:
   determining that the UE is in a registered state and a connected state for the first access via the first N1 signaling interface, wherein determining whether the first access via the first N1 signaling interface or the second access via the second N1 signaling interface is the preferred access is based at least in part on the UE being in the registered and the connected state for the first access via the first N1 signaling interface.

4. The method of claim 1, further comprising:
determining that the UE is in an deregistered state and an unconnected state for the first access via the first N1 signaling interface and a registered state and a connected state for the second access via the second N1 signaling interface, wherein determining whether the first access via the first N1 signaling interface or the second access via the second N1 signaling interface is the preferred access is based at least in part on determining that the UE is in the deregistered state and the unconnected state for the first access via the first N1 signaling interface and the registered state and the connected state for the second access via the second N1 signaling interface, and wherein transmitting the non-access stratum (NAS) signaling for the control plane service comprises transmitting the non-access stratum (NAS) signaling for the control plane service over the second access via the second N1 signaling interface based at least in part on determining that the first access via the first N1 signaling interface is not the preferred access.

5. The method of claim 1, further comprising:
selecting, for the control plane service, a first preference level of the first access via the first N1 signaling interface and a second preference level of the second access via the second N1 signaling interface based at least in part on a preference indicator indicated by the UE, subscription information for the UE, a type of the UE, a capability of the UE, a state of the UE, an origin of the data, network parameters, or any combination thereof, wherein determining whether the first access via the first N1 signaling interface or the second access via the second N1 signaling interface is the preferred access is based at least in part on selecting the first preference level and the second preference level.

6. The method of claim 5, further comprising:
transmitting, to the UE, an indication of the first preference level of the first access via the first N1 signaling interface, or the second preference level of the second access via the second N1 signaling interface, or both.

7. The method of claim 1, wherein determining whether the first access via the first N1 signaling interface or the second access via the second N1 signaling interface is the preferred access comprises determining that the first access via the first N1 signaling interface is the preferred access, and wherein transmitting the non-access stratum (NAS) signaling for the control plane service comprises transmitting the non-access stratum (NAS) signaling over the second access via the second N1 signaling interface based at least in part on determining that the first access via the first N1 signaling interface is the preferred access.

8. The method of claim 7, the method further comprising:
determining that the first access via the first N1 signaling interface is unavailable for the signaling for the control plane service, wherein transmitting the non-access stratum (NAS) signaling for the control plane service comprises transmitting the non-access stratum (NAS) signaling over the second access via the second N1 signaling interface based at least in part on determining that the first access via the first N1 signaling interface is unavailable.

9. The method of claim 1, wherein identifying the data comprises identifying data received from a second network entity, the method further comprising:
receiving an indicator of a preferred access type for delivering the data from the second network entity.

10. The method of claim 9, wherein receiving the indicator comprising:
receiving the indicator of the preferred access type with the data for the control plane service.

11. The method of claim 9, wherein determining whether the first access via the first N1 signaling interface or the second access via the second N1 signaling interface is the preferred access comprises determining that the first access via the first N1 signaling interface is of the preferred access type, the method further comprising:
determining that the first access via the first N1 signaling interface is unavailable for the signaling for the control plane service, wherein transmitting the non-access stratum (NAS) signaling for the control plane service comprises transmitting the non-access stratum (NAS) signaling for the control plane service over the second access via the second N1 signaling interface based at least in part on determining that the first access via the first N1 signaling interface is unavailable.

12. The method of claim 1, further comprising:
receiving, from the UE, a request restricting communications for the control plane service from being performed on the first access via the first N1 signaling interface;
overruling the request based at least in part on a network parameter, wherein determining whether the first access via the first N1 signaling interface or the second access via the second N1 signaling interface is the preferred access comprises determining that the first access via the first N1 signaling interface is preferred based at least in part on overruling the request; and
transmitting, to the UE, an indication that the request has been overruled, wherein transmitting the signaling for the control plane service comprises transmitting the signaling over the first access via the first N1 signaling interface based at least in part on overruling the request, wherein transmitting the signaling for the control plane service comprises transmitting the signaling over the first access via the first N1 signaling interface based at least in part on overruling the request.

13. The method of claim 1, wherein the control plane service is a non-protocol data unit (PDU) service.

14. The method of claim 1, further comprising:
determining that communications for the control plane service are barred on the first access via the first N1 signaling interface;
transmitting, to the UE, an indication that communications for the control plane service are barred on the first access via the first N1 signaling interface, wherein determining whether the first access via the first N1 signaling interface or the second access via the second N1 signaling interface is the preferred access is based at least in part on determining that communications for the control plane service are barred on the first access via the first N1 signaling interface.

15. The method of claim 1, further comprising:
receiving, from the UE, a request to renegotiate a preference level for communicating non-access stratum (NAS) signaling for the control plane service; and
modifying the preference level for the control plane service based at least in part on the request.

16. A method for wireless communication at a first network entity, comprising:
- identifying a first access and a second access each associated with a user equipment (UE);
- identifying data for a control plane service associated with the UE, wherein identifying the data comprises identifying data received from a second network entity;
- receiving an indicator of a preferred access type for delivering the data from the second network entity;
- determining whether the first access or the second access is a preferred access for communicating signaling for the control plane service, wherein determining whether the first access or the second access is the preferred access comprises determining that the first access is of the preferred access type;
- determining that the first access is unavailable for the signaling for the control plane service;
- transmitting, to the second network entity, an indication that the first access is unavailable; and
- transmitting, to the UE, signaling for the control plane service over the first access or the second access based at least in part on determining whether the first access or the second access is the preferred access.

17. A method for wireless communication at a first network entity, comprising:
- identifying a first access via a first N1 signaling interface and a second access via a second N1 signaling interface each associated with a user equipment (UE), wherein the first N1 signaling interface is a different N1 signaling interface from the second N1 signaling interface ;
- identifying data for a control plane service associated with the UE;
- receiving, from the UE, a request restricting communications for the control plane service from being performed on the first access;
- determining whether the first access via the first N1 signaling interface or the second access via the second N1 signaling interface is a preferred access for communicating signaling for the control plane service, wherein determining whether the first access or the second access is the preferred access comprises determining that the second access is the preferred access based at least in part on the request; and
- transmitting, to the UE, signaling for the control plane service over the first access via the first N1 signaling interface or the second access via the second N1 signaling interface based at least in part on determining whether the first access via the first N1 signaling interface or the second access via the second N1 signaling interface is the preferred access, wherein transmitting the signaling for the control plane service comprises transmitting the signaling over the second access via the second N1 signaling interface based at least in part on determining that the second access via the second N1 signaling interface is preferred.

18. An apparatus for wireless communication, comprising:
- a processor;
- memory coupled with the processor; and
- instructions stored in the memory and operable, when executed by the processor, to cause the apparatus to:
  - identify a first access via a first N1 signaling interface and a second access via a second N1 signaling interface each associated with a user equipment (UE), wherein the first N1 signaling interface is a different N1 signaling interface from the second N1 signaling interface;
  - identify data for a control plane service associated with the UE;
  - determine whether the first access via the first N1 signaling interface or the second access via the second N1 signaling interface is a preferred access for communicating non-access stratum (NAS) signaling for the control plane service; and
  - transmit, to the UE, non-access stratum (NAS) signaling for the control plane service over the first access via the first N1 signaling interface or the second access via the second N1 signaling interface based at least in part on determining whether the first access via the first N1 signaling interface or the second access via the second N1 signaling interface is the preferred access.

* * * * *